United States Patent
Kumar et al.

(10) Patent No.: US 9,626,430 B2
(45) Date of Patent: Apr. 18, 2017

(54) SYSTEMS AND METHODS FOR DATA MINING AND AUTOMATED GENERATION OF SEARCH QUERY REWRITES

(71) Applicant: eBay Inc., San Jose, CA (US)

(72) Inventors: Prathyusha Senthil Kumar, San Jose, CA (US); Praveen Arasada, San Jose, CA (US); Ravi Chandra Jammalamadaka, Santa Clara, CA (US)

(73) Assignee: eBay Inc., San Jose, CA (US)

(*) Notice: Subject to any disclaimer, the term of this patent is extended or adjusted under 35 U.S.C. 154(b) by 291 days.

(21) Appl. No.: 14/579,946

(22) Filed: Dec. 22, 2014

(65) Prior Publication Data
US 2016/0179807 A1 Jun. 23, 2016

(51) Int. Cl.
*G06F 17/30* (2006.01)

(52) U.S. Cl.
CPC ................. *G06F 17/3064* (2013.01)

(58) Field of Classification Search
USPC ........................ 707/706, 708, 721
See application file for complete search history.

(56) References Cited

U.S. PATENT DOCUMENTS

| | | | |
|---|---|---|---|
| 5,544,355 A * | 8/1996 | Chaudhuri | G06F 17/30463 |
| 5,778,364 A | 7/1998 | Nelson | |
| 7,024,425 B2 | 4/2006 | Krishnaprasad et al. | |
| 8,811,951 B1 | 8/2014 | Faaborg et al. | |
| 9,348,895 B2 * | 5/2016 | Bao | G06F 17/30672 |
| 2001/0029455 A1 | 10/2001 | Chin et al. | |
| 2005/0246332 A1 | 11/2005 | Wang et al. | |
| 2008/0256035 A1 | 10/2008 | Zhang et al. | |
| 2009/0069642 A1 | 3/2009 | Gao et al. | |
| 2009/0198644 A1 * | 8/2009 | Buchner | G06F 17/3064 |
| 2009/0216710 A1 * | 8/2009 | Chang | G06F 17/30672 |
| 2013/0176142 A1 | 7/2013 | Drysdale et al. | |
| 2013/0246449 A1 | 9/2013 | Balannik et al. | |
| 2013/0262350 A1 * | 10/2013 | Garg | G06N 99/005 706/12 |

(Continued)

FOREIGN PATENT DOCUMENTS

WO WO-2012061438 A2 5/2012

OTHER PUBLICATIONS

"International Application Serial No. PCT/US2015/061300, International Search Report mailed Feb. 2, 2016", 2 pgs.

(Continued)

*Primary Examiner* — Cam-Linh Nguyen
(74) *Attorney, Agent, or Firm* — Schwegman Lundberg & Woessner, P.A.

(57) ABSTRACT

Various embodiments include systems and methods for data mining of search engine and network operations to automatically identify query events. Data aggregated from such query events and stored as query history data may be processed to identify query ranking mismatches. These identified mismatches may be used with the query history data and target settings to automatically generate query rewrite data. In certain embodiments, this query rewrite data may be used to generate query rewrite input language (QRIL) records. Such QRIL records may then be used to automatically generate standardized rewrites which automatically resolve any conflicts between rewrites in a particular search engine.

20 Claims, 13 Drawing Sheets

(56) References Cited

U.S. PATENT DOCUMENTS

2013/0262351 A1* 10/2013 Garg .................... G06N 99/005
                                                           706/12
2013/0290427 A1   10/2013  Proud
2014/0052567 A1    2/2014  Bhardwaj et al.
2014/0073969 A1    3/2014  Zou et al.
2014/0130076 A1    5/2014  Moore et al.
2014/0142403 A1    5/2014  Brumback et al.
2014/0236847 A1    8/2014  Hamilton
2014/0275854 A1    9/2014  Venkatraman et al.
2014/0343380 A1   11/2014  Carter et al.

OTHER PUBLICATIONS

"International Application Serial No. PCT/US2015/061300, Written Opinion mailed Feb. 2, 2016", 16 pgs.
"International Application Serial No. PCT/US2015/064928, International Search Report mailed Feb. 5, 2016", 2 pgs.
"International Application Serial No. PCT/US2015/064928, Written Opinion mailed Feb. 5, 2016", 12 pgs.

* cited by examiner

QRIL 500

CONSTRAINTS 510

CATEGORY 512
SITE 514
COUNTRY 516

METAFLAGS 520

ALLOWSUBKEYPROPAGATION 524
WHOLEQUERY 526
DIRECT 528
EXCLUDE 530
DERIVEDREWRITESDISABLED 532
TOKENREFINEMENT 534
PHRASE 536
PHRASE CATEGORIES 538
CATEGORYMATCH 539

TRIGGER 540

REWRITE VALUE 550
CATEGORY REWRITE 552

SYSTEMS AND METHODS FOR DATA MINING AND AUTOMATED GENERATION OF SEARCH QUERY REWRITES

TECHNICAL FIELD

The present application relates generally to the technical field of electronic searching, and in particular to query rewrite systems and processes which may be used as part of electronic searching.

BACKGROUND

In an online system providing search results based on user queries, often the objects being searched are evaluated under a variety of factors in order to produce search results that meet the user's needs as well as the needs of the online system. Query rewriting is one aspect of such a search engine. Query rewriting functions to adjust the terms used in a search to match the available search results, and in some systems query rewriting is primarily responsible for establishing the set of results that are retrieved in response to a user's search query. Systems and methods described herein relate to improved query rewriting.

BRIEF DESCRIPTION OF THE DRAWINGS

Some embodiments are illustrated by way of example and not limitation in the figures of the accompanying drawings in which.

DETAILED DESCRIPTION

Figure 1:
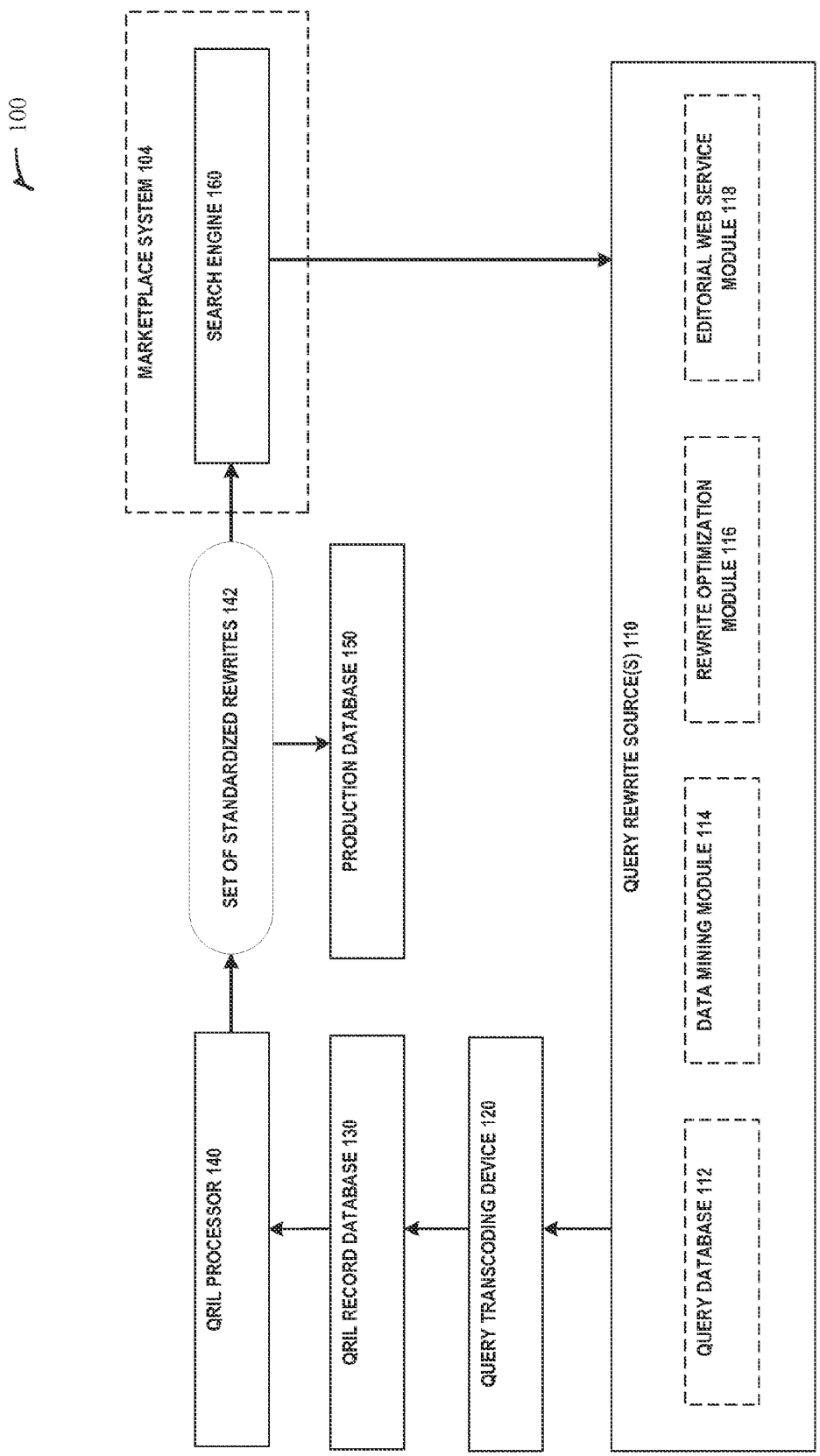
FIG. 1 is a block diagram of a system for automatic generation of query rewrite data according to certain example embodiments.

Example methods and systems for electronic searching are described, including example embodiments of query rewrite systems and processes which are used with electronic searching.

Query rewriting is an aspect of certain search engines. Query rewriting refers to a process of matching query terms received from a user with synonyms or other known information about query terms, and using that information to provide a set of search results that are superior to search results that would be provided by applying a standard search algorithm to the received query terms. As such, query rewriting may play a role in the processing of a user's search query and in the generation of a set of search results which is the set of results sent to a user in response to the user's query.

Query rewriting provides a benefit where search results or ranked results sets may be influenced for a particular user query without manipulating core search ranking or matching models, which could compromise the integrity of the search engine. Instead, query rewrites provide a direct way of influencing results in a highly customizable fashion. For example, rewrites may be established for certain categories of user queries, or for rewrites originating from a particular source.

Certain embodiments described herein implement improved query rewriting using a query rewrite input language (QRIL) in combination with rewrite systems and methods to provide improved query rewriting. For example, a search engine may include an ad hoc set of rewrite instructions which are generated individually or in groups, but without systems and methods for considering the impact of new rewrite on the system. As additional rewrites are added to such an ad hoc system of rewrites, conflicts between different rewrites may be present without a system operator being aware of the conflicts. Such a conflict may exist, for example, when a search term or trigger is associated with two different rewrite values. This may produce unexpected and undesired set of search results in response to a user query depending on how the rewrite values are applied. Embodiments described herein may transcode individual rewrites into QRIL records which identify the characteristics of an individual rewrite. The QRIL record may then be processed by a QRIL processor along with all other QRIL records in a system to generate a set of standardized rewrites. When the QRIL record is processed, a standardized structural relationship is established with any overlapping or conflicting QRIL records and the associated rewrites. For example, two QRIL records with overlapping constraints that indicate that a query token should be rewritten in two different ways are resolved by the QRIL processor according to precedence rules. The precedence rules may be based on rewrite type, entry time, entry entity, or any other metadata or flag contained within the QRIL record. The standardized rewrites as generated by the QRIL processor may then be provided to a search engine for use in responding to user search queries. The standardized rewrites are generated using the semantic structure and rules that the search engine accepts for user queries. The search engine that uses the standardized rewrites may be the same search engine from which the ad hoc set of query rewrites was obtained, or this may be a different search engine.

In addition to using ad hoc sets of query rewrites as query rewrite data that may be used to generate QRIL records and standardized rewrites, data mining associated with user activities may be used to generate such query rewrite data. For example, a marketplace or publication system may include not only a search engine, but payment, sale, and other system portions relating to user selections after a ranked result set is presented to a user following a user query. User search queries, ranked results sets based on those queries, user selection or non-selection of items from such ranked result sets, and other user actions such as purchases may be monitored by a networked system. This information may all be gathered as query history data. When a sufficient amount of data is gathered for a particular query, mismatches between certain user queries or query terms may be identified. Such a mismatch may, for example, be where the items that are statistically likely to be selected in response to a query are not likely to be presented as part of a ranked result set for the query. In the case of such a mismatch, a data mining device may gather the query history data, identify the mismatch using data mining system settings, and automatically generate query rewrite data that may be processed to generate a standardized rewrite that corrects the mismatch in the search engine.

Many embodiment search engine have tight service specifications which require a response be sent to a user search query within a short amount of time. Because of this, a query rewrite system according to certain example embodiments must provide a rewrite within fractions of a second or even fractions of a millisecond in some embodiments. Such service requirements do not allow for the search engine or rewrite system to make calls to a QRIL record database or standardized rewrite database due to the time associated with such calls. Instead, in certain example embodiments, standardized records are loaded into memory cache in a search engine system to provide adequate query rewrite response time when a user query is received.

As described herein, a rewrite or query rewrite refers to a translation used by a search engine that changes or transforms all or part of a user query into another form. A query rewrite includes at least a trigger, which is a value or a set of values and logical operators to be transformed, and a rewrite value, which is the transformation value applied to the trigger. A query rewrite refers to the transform as it is used by the search engine and in the form in which it is used by the search engine. This may include the use of specific file formats, text configuration, and a streamlined set of elements that is different from the set of elements in an associated QRIL record. A query rewrite as used herein is therefore different from a query rewrite input language (QRIL) record, though query rewrites and QRIL record are discussed together in detail below. Standardized query rewrites are rewrites that have been created by a QRIL processor from QRIL records in order to eliminate conflicts and to apply a standardized set of rules to application of the rewrites described by the QRIL records.

A QRIL record as described herein refers to a domain specific data structure which describes a query rewrite along with other information about the query rewrite that enable a system to resolve conflicts between different query rewrites, as well as cure ambiguities about query rewrites that are not sufficiently defined in accordance with the expectations of a search engine. Systems and methods for generating and using QRIL records along with their associated query rewrites are described in detail below.

As described herein, a user query refers to information received by a search engine system from a client device that represents a user's search for information. A user query may, in various embodiments, take various forms. In one particular embodiment, a user query comprises a string of characters. The string may include multiple words, symbols, spaces, or numbers in any format.

A search engine as referred to herein is one or more devices configured to receive a user query, and search information available to the search engine to create a list of matches related to the information in the user query. Any number of different matching algorithms may be used by search engines in accordance with the embodiments described herein. Query rewriting as detailed herein particularly enables the matches generated by a search engine to be adjusted by a system operator. While similar adjustments may be made by a system operator that adjusts the matching algorithms used by the search engine, query rewriting enables a system operator to make such adjustments without risking the integrity of the matching algorithms. Where adjusting weights within a matching algorithm carries a significant risk of impacting matching results in unexpected ways, embodiments of standardized rewrites and search engines using such standardized rewrites described herein enable a user to influence the set of search results output by a search engine in defined and predictable ways using query rewrites that leave the matching algorithm intact and unchanged. Instead, standardized rewrites adjust the inputs to the matching algorithm in order to customize or just search engine operation as desired by a system operator or other system user with an ability to generate query rewrites. Similarly, in a large complex system involving data mining, third parties, ecommerce sales pages, search engines associated with large numbers of ecommerce sales pages and products, and additional system complexities, a standardized query rewrite system enables decoupling of elements of ecommerce searching from complex search engine systems. This also formalizes query rewrites in a way that enables different such parties to readily understand individual query rewrites, and further formalizes the interaction of a specific query rewrite with every other query rewrite in the system.

Additionally, while use of query rewrites maintains the integrity of search engine matching algorithms, unstructured query rewrites may conflict with each other. For example a first query rewrite may translate "Smartphone A" into "Product B." A second query rewrite may translate "Smartphone A" into "Product Characteristic C." A third query rewrite may translate every token instance of "smartphone" into "device A." These query rewrites may interact in complex and unpredictable ways. This is especially true if the source of a first query rewrite is different than the source of the third query rewrite so that the creator of the first query rewrite creator is unaware of the other overlapping or conflicting query rewrites. Large search engine embodiments may include millions of query rewrites. A search engine for a large e-commerce system may, for example, include more than 25 million rewrites. Embodiments described herein provide for standardized precedence rules which determine how conflicts and interactions between different query rewrites operating in the same system are resolved.

Aspects of the embodiments described herein relate to classification of rewrite types. Certain embodiments may use different classifications of rewrite types. As discussed herein "direct" or basic rewrites are one type of rewrite, phrase rewrites are a type of rewrite, "token refinements" are a type of rewrite, and "whole query rewrites" are a type of rewrite. Other implementations may include other classifications of rewrites.

As referred to herein, direct rewrites involve a trigger directly associated with a rewrite value. While a direct rewrite may have additional associated aspects, including various constraints, categories, and metadata, the basic structure is the direct association between the trigger and the rewrite value. An example of a direct rewrite structure including additional information associated with an ecommerce search engine is:

Constraints=[Ecommerce site where Query was issued, Trigger, Category Constraint, Query Origin Country]
Rewrite=[Rewrite Value, Category Rewrite, Aspect Rewrite, Item Listing Siteid]

An example rewrite using the above structure is:
Constraints=[Ecommerce Site where Query was issued="USA", Keyword Trigger="fone", Category="electronics", Query Origin Country="Canada"]
Rewrite=[Keyword Rewrite="smartphone", Category Rewrite="123456", Aspect Rewrite="None", Item Listing Siteid="Canada"]

As used herein, a phrase rewrite involves rewriting a trigger to a phrase, where a phrase is defined as a sequence of contiguous word tokens. This is different from a direct rewrite in that a direct rewrite may have a rewrite value which is a single token, where the rewrite value of a phrase rewrite is a phrase involving multiple tokens. Additionally, while a direct rewrite may have a rewrite phrase with multiple tokens, the token order for the rewrite value of a direct rewrite is not specified. A phrase rewrite enables recalling of a more specific set of items than a corresponding direct rewrite. For example: a direct rewrite with trigger "built in camera" and rewrite value "built in rear camera", will match more items than the a phrase rewrite with the same trigger "built in camera" and the rewrite value "built in PHRASE(rear camera)." In certain circumstances, the phrase rewrite is preferable since it will match a more precise set of items.

As used herein, a token refinement refers to a rewrite that involves adding or dropping keywords from a trigger. For example, if the trigger "cheap new princess smartphone cases" does not provide an acceptable set of search results, a system may use a token refinement rewrite to drop words (i.e. tokens) from the query. If the terms trigger is seen often enough in user queries, the system may gather information sufficient to determine that the tokens "cheap" and "new" are not key to the search result elements that a user is typically trying to retrieve using this search query. A token refinement deleting these terms may thus be used to rewrite "cheap new princess smartphone cases" to "princess smartphone cases." This is an example of token dropping. Conversely, token refinement may also be used to add words to a query. For example, a trigger "brand A" may have a token refinement rewrite value of "model #123" which may the only popular product within an ecommerce search engine associated with brand A. A token refinement is a change to a trigger rather than a conventional rewrite that replaces a trigger value in a user query with a rewrite value. While certain token refinements may have the same functional effect as a direct rewrite in some circumstances, the creation of categories for direct rewrites and token refinement rewrites enables conflict resolution and certain types of QRIL record structures in various embodiments.

FIG. 1 is a block diagram of an example embodiment of a system 100 for generating, processing, and using query rewrite input language (QRIL) records. A QRIL is a domain specific language. Particular embodiments described herein may provide a QRIL which is a domain specific language for e-commerce searching and e-commerce specific search query rewrites. While certain example embodiments described herein are particularly related to e-commerce and e-commerce search queries, it will be apparent that aspects of the embodiments described herein will apply to other types of search query domains.

System 100 includes query rewrite sources 110, query transcoding device 120, QRIL record database 130, QRIL processor 140, production database 150, and search engine 160. The set of standardized rewrites 142 are also illustrated as an output of QRIL processor 140 that is communicated to search engine 160, production database 150, or both.

As shown by system 100, query rewrite sources 110 comprises a number of different rewrite sources. This may include any number of the example rewrite sources shown as well as other types of rewrite sources. Query rewrite sources 110 is illustrated as including query database 112, data mining module 114, rewrite optimization module 116, and editorial web service module 118.

Query database 112 comprises a local database of ad hoc query rewrites or a set of ad hoc query rewrites from a variety of networked database sources. For example query database 112 may include a set of query rewrites or a search engine that is different than search engine 160. This may include search engines which use a different query rewrite format and/or structure than that used by search engine 160. This information may be sent to query transcoding device 120 as a set of query rewrite data.

Data mining module 114 comprises a system that analyzes user queries, search results that are search engines response to those user queries, and the user selection following a user's receipt of the search results. Such a user selection may include selection of a link to a particular website, the user purchase of a product that was listed in the search results, or any other recorded user action taken following a user's receipt of the search results associated with the user query. Such data may additionally include information about different query rewrites that were used with different users that submitted the same initial search query. With a sufficiently large data set, statistical information and analysis may be generated for particular input queries, query rewrites, search results, and user responses. Data mining module 114 may analyze such information to generate sets of query rewrite data.

Rewrite optimization module 116 comprises a database of rewrites such as production database 150. For example, standardized rewrites 142 from production database 150 may be communicated to rewrite optimization module 116. Rewrite optimization module 116 may then analyze the set of standardized rewrites 142 to identify inefficiencies, redundant rewrites, or to generate new rewrites based on rewrites present as part of the set of standardized rewrites 142. The new rewrites identified by optimization module 116 or any redundant or inefficient rewrites identified by rewrite optimization module 116 may be communicated as a set of query rewrite data to query transcoding device 120.

Editorial web service module 118 comprises a service portal that enables third parties access to system 100 to generate customized QRIL records and associated standardized rewrites. For example, editorial web service module 118 may include a registration server that enables a merchant that sells products on an e-commerce portal associated with search engine 162 to submit sets of query rewrite data to query transcoding device 120. In such embodiments, the merchant may be associated with a particular constraint. For example, the merchant may have a storefront or portal as part of the e-commerce site associated with search engine 160. QRIL records generated from sets of query rewrite data provided by the merchant may automatically include a constraint that limits standardized rewrites generated from those QRIL records to the merchant's storefront. Additionally, because the QRIL processor 140 implements precedence rules, the system 100 limits the potential errors that may be introduced by sets of query rewrite data from third parties that are received via editorial web service module 118.

Query transcoding device 120 accepts sets of query rewrite data from query rewrite sources 110 and uses this information to generate QRIL records. Such QRIL records may be generated exclusively from information received from a single query rewrite source 110 or a QRIL record may be generated from query rewrite data received from multiple sources. In certain embodiments, history data stored by query transcoding device 120 may be used in conjunction with query rewrite data from Craig rewrite sources 110 to generate a QRIL record. Additional details related to query transcoding and query transcoding device 120 are discussed below with respect to query transcoding system 400 of FIG. 4.

Once one or more QRIL records are generated by query transcoding device 120, the QRIL records are stored at QRIL record database 130. QRIL record database 130 may be a memory storage device that is integrated with query transcoding device 120, QRIL processor 140, or any other device. QRIL record database 130 stores sets of QRIL records which may be used to generate sets of standardized rewrites such as set of standardized rewrites 142. In certain embodiments, QRIL record database 130 may include separate sets of QRIL records. This may enable a single query transcoding device 120, QRIL record database 130, and QRIL processor 140 to provide sets of standardized rewrites that are distinct to different search engines.

When a set of standardized rewrites 142 is to be generated for search engine 160, QRIL processor 143 use QRIL records from QRIL record database 130. In certain embodiments, each QRIL record may be retrieved individually, or a set of QRIL records may be requested by QRIL processor 140 all at one time. QRIL processor 140 then analyze the set of QRIL records from QRIL record database 130 to generate the set of standardized rewrites 142. As part of this process, a rewrite type associated with each QRIL element may be identified, and other constraint and or metaflag information may be processed to both generate a standardized rewrite and to resolve any conflicts between standardized rewrites defined by different QRIL elements. The set of standardized rewrites 142 is the output of QRIL processor 140 that results from QRIL processor 140 analyzing the QRIL records from QRIL record database 130. When the set of standardized rewrites 142 is complete, it may be output from QRIL processor 140 to production database 150. In various embodiments, production database 150 is optional. As described above, production database 150 may be used to verify the actual standardized rewrites which are active in search engine 160. Production database 150 may also be used by the rewrite optimization module 116 to further refine rewrites in later updated versions of the set of standardized rewrites 142. Production database 150 may also be used with a test search engine to verify the impact of certain QRIL records on standardized rewrites and the search results associated with user queries that are rewritten by the standardized rewrites. For example, editorial web service module 118 may provide a merchant access to a test search engine, which is not shown, as well as the rewrites of the set of standardized rewrites 142 related to the merchant in production database 150. Editorial web service module 118 may enable a merchant to provide a set of query rewrite data that will be processed by Corey transcoding device 120 and QRIL processor 144 a nonproduction set of standardized rewrites based on the merchants changes from the merchants set of query rewrite data. The merchant may then submit test queries to observe how these test query rewrites interact with previously existing standardized rewrites to generate a set of search results within the test search engine.

Search engine 160 may be any search engine which uses query rewrites such as the set of standardized rewrites 142. As mentioned above, particular e-commerce related search engines are detailed herein, particularly in search engine 800 of FIG. 8. In one particular embodiment, search engine 160 is an e-commerce search engine that uses a product category tree as part of a search matching algorithm to generate search results from user queries. Because an e-commerce web portal associated with such an e-commerce search engine is directed to identifying products for a user to purchase, such a category tree integrated with search engine 160 may provide constraints and metaflag information which may be integrated with query rewrites to structure product searches and search results within an e-commerce search engine. For example, such a category tree may enable brand names associated with certain product types to be matched to searches for a product type. Such matches may not be made in a system using text or word matching algorithms. Additional details related to such an e-commerce search engine and category metaflag information with in standardized query rewrites and associated QRIL records are discussed in more detail below. As illustrated in the embodiment of system 100, search engine 160 is part of marketplace system 104. Marketplace system may be similar, in certain embodiments, to network 1100 of FIG. 11. In other embodiments, search engine 160 may be separate from such a marketplace system 104.

System 100 describes one potential implementation of a system for generating QRIL records and associated standard rewrites, as well as using standard rewrites generated from QRIL records in a search engine. In various embodiments each of the elements of system 100 may be implemented as a module in a single device or multiple devices. Such elements may also be implemented as separate devices or as systems operating across multiple devices. As such, query transcoding device may be a module operating on the same device with QRIL processor 140. Alternatively, query transcoding device 120 may be a network system of computing devices which are further networks to one or more devices which make up QRIL processor 140.

Figure 2:
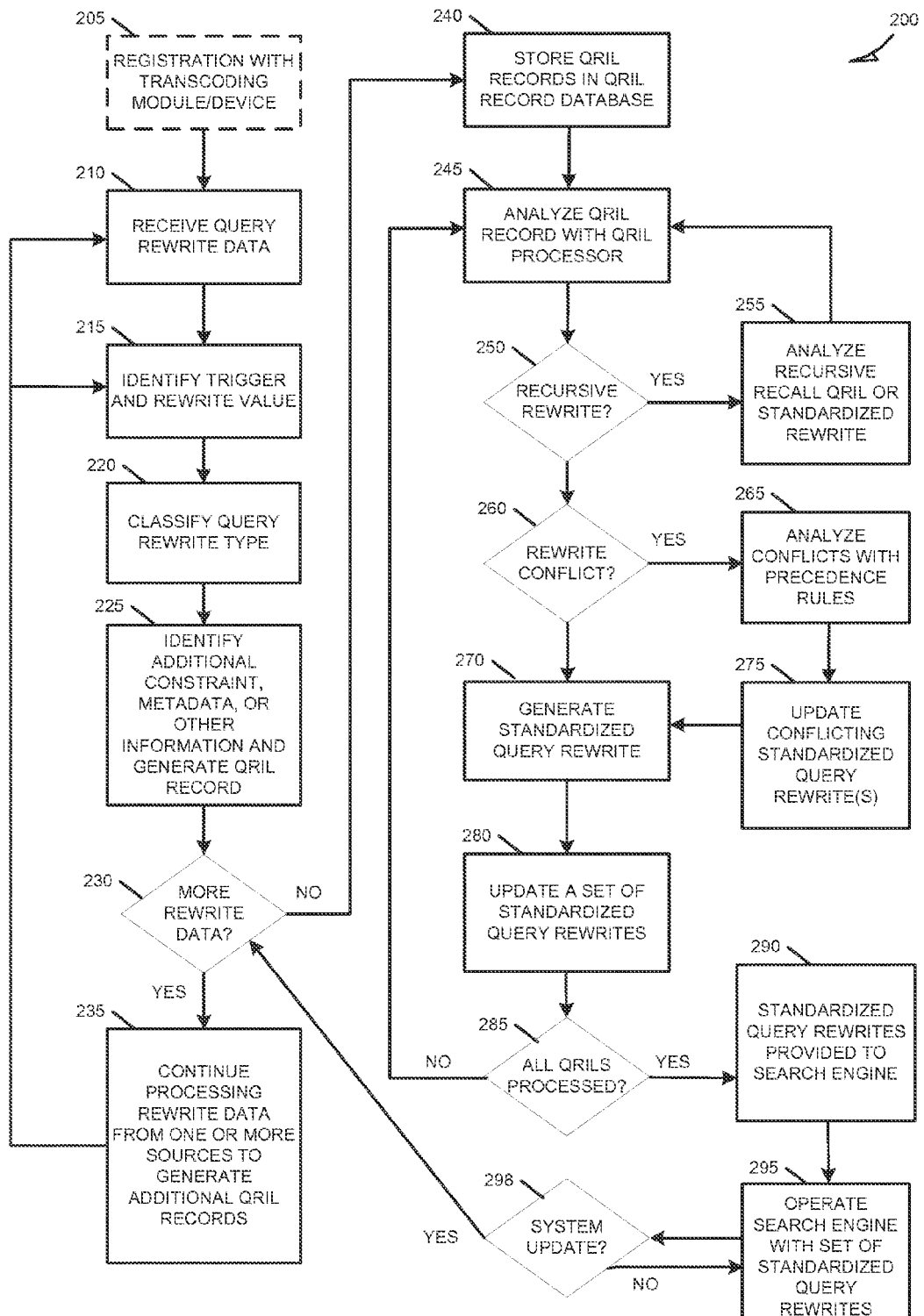
FIG. 2 is a flow diagram illustrating details of an example method for generating, processing, and using QRIL records from query rewrite data according to certain example embodiments.

FIG. 2 is a flow diagram illustrating details of an example method 200 for generating, processing, and using QRIL records according to one embodiment. While such a method 200 may be performed by a variety of different embodiments of the innovations presented herein, for illustrative purposes, the operations of method 200 are described in the context of system 100.

Operation 205 is an optional registration step as described above with respect to editorial web service module 118. Such a registration may enable certain system users to generate QRIL records with constraint values that limit the rewrites associated with the QRIL records to searches particularly associated with the system user than generates the QRIL records. An example of such an association may be a merchant operating a virtual storefront with access to a broader publication system such as system 700. Such a QRIL record may include a constraint that limits the associated standardized rewrites to applying only to queries received from the merchant's virtual storefront. Operation 205 may occur when a third party such as a merchant, a search consultant, a system user, a middleware provider, or any other such third-party is provided access to system 100. Operation 205 is a registration with query transcoding device 120. In various other embodiments, an intermediate editorial web service module 118 may entirely handle the registration system, or additional security layers and user interface layers may be presented to handle registration, access, and other various account details. In other embodiments, query rewrite resources 110 and query transcoding device 120 may be communicatively coupled as part of a network or some other communication path, without the need for and associated registration process.

In operation 210, query rewrite data is received by query transcoding device 120. This may be in response to an operator selection or an automatic update of query rewrite data that is periodically provided to query transcoding device 120 as part of a system update. In embodiments where the query rewrite data is provided to query transcoding device 120 in response to an operator selection, the selection may be made by a user operating a machine such as third party server 730, client machine 710 or client machine 712 described in more detail below. As part of the operation of such devices, third party application 728, a web client 706 or programmatic client 708 may include a user interface with an input selection that enables the user to transmit query rewrite data two query transcoding device 120. Such applications or clients may communicate with query transcoding device 120 or an intermediate registration device or application to register with system 100 as part of the previous operation 205. Options for automatic communication of query rewrite data or user selected communication of query rewrite may be selected by the user as part of registration, or may be set automatically by predetermined system settings.

In operation 215, the query rewrite data that is received in operation 210 is analyzed to identify a trigger and associated rewrite value. As used herein, a trigger refers to characters, words, phrases, symbols, or any other sets of information which, when received as part of a user query, are used to initiate a rewrite to transform those sets of information into another form as part of a rewrite. For example, the word "smart phone" may be a trigger. And associated rewrite value may be "brand A phone." If the query rewrite data is received from a query database 112 that included sets of query rewrites, the trigger and associated rewrite value may be explicitly identified in the query rewrite data. In this case, the character parser may be used to identify the trigger and the rewrite value from the query rewrite data. If the trigger and associated rewrite value are not explicitly identified by a character parser that analyzes the query rewrite data, additional analysis may be performed to identify a trigger in rewrite, or the query rewrite data may be flagged by query transcoding device 120 as data not containing a trigger or rewrite, and a QRIL record may not be created from this data. Additional details associated with trigger identification and rewrite identification are described below with respect to query transcoding device 400 of FIG. 4.

In operation 220, a query rewrite type is assigned to the identified trigger and rewrite. The query rewrite type is used to determine priority or precedence levels that the standardized rewrite derived from the query rewrite data will received. The query rewrite type is determined by a structure of the rewrite, supporting data or metadata associated with the rewrite as part of the query rewrite data, or both. The rewrite above where "smart phone" is associated with the rewrite "brand A phone" is referred to herein as a direct rewrite. The structure of a direct rewrite comprises a trigger and a rewrite value. This is the simplest structure, where the rewrite involves replacing the trigger with the rewrite value. Additional examples of rewrite types include phrase rewrites, token refinement rewrites, and whole query rewrites. Additional details related to query rewrite types and specific example embodiments of different query rewrite types are discussed below.

In operation 225 any other related constraint or metadata information present in the query rewrite data may be identified. Similar to the identification of the trigger in the rewrite value, this other related constraint or metadata information may be present in the data as sets characters, and a character parser may identify character groupings which are known to match certain constraints related to elements of a QRIL record. An example QRIL record including a number of different QRIL elements is illustrated by QRIL record 700 and the various components of QRIL record 700 illustrated by FIG. 7. Any of the components of QRIL record 700 may be identified by a parser as part of operation 220.

Additionally, in operation 225, the QRIL record is generated from the trigger, rewrite value, query rewrite type, and related constraint or metadata information identified in operations 215 and 220. Such a record may be generated using a processor to create the record structure and to gather text, symbol, or other operator information from a parser used in operations 215 and 220. Additional details of systems that may be used for QRIL record generation are discussed with respect to FIG. 4 below. QRIL records may be structured with a specific number of elements or may be generated using only elements which have associated information that is identified from the query rewrite data. If a QRIL record a structured with a set number of elements, and information is not identified for a particular QRIL element, the QRIL record may be structured with that element having a zero or null entry. As mentioned above, QRIL 700 is an example of a QRIL record, and in one implementation, QRIL record 700 may be generated during operation 225. Additional details related to QRIL records are discussed below, particularly with respect to QRIL record 500 of FIG. 5.

In operation 230, the system checks to see if additional QRIL record can be generated from the received query rewrite data, or if there is additional query rewrite data to be received and analyzed from one or more query rewrite sources 110. If additional query rewrite data is still to be analyzed, the process continues in operation 235 with processing additional rewrite data from one or more sources. This query rewrite data may be from a single query rewrite source 110, or multiple of the query rewrite sources 110. This may include any of the sources shown as part of query rewrite sources 110 including query database 112, data mining module 114, rewrite optimization module 116, or editorial web service module 118. Operations 215 through 230 are then repeated can tell no additional query rewrite data remains to be processed. In various embodiments, this processing of query rewrite data in operations 210 through 230 may be performed simultaneously using any number of processors, query transcoding devices 120, or other modules or devices that perform such operations. In other embodiments, this processing may be a set of operations performed periodically, or performed whatever a trigger identifying new query rewrite data is received. In certain embodiments, QRIL records may be generated in operations 210 through 230 and aggregated so that QRIL records generated at different times are all communicated to a QRIL record database together. In other embodiments each QRIL record is stored in a QRIL record database 130 as it is generated. In certain embodiments, a single query transcoding device 120 may sent QRIL records to multiple databases, and a target database may be determined by information identified from query record data, by an identity of a query rewrite source 110, or by information received as part of a registration in operation 205.

If no additional rewrite data is identified in operation 230, then all of the QRIL records are stored at QRIL record database 130 in operation 240. The QRIL records stored at QRIL record database 130 may be stored for later use such that there is a delay in time between operation 240 and operation 245, or updates and new QRIL records stored in QRIL database 130 may be immediately communicated to a QRIL processor for analysis.

In operation 245 the QRIL records are analyzed by one or more and QRIL processors. In certain embodiments, individual QRIL records may be analyzed serially by a single QRIL processor. In other embodiments, QRIL records may be analyzed in parallel by one or more QRIL processors such as QRIL processor 140. The QRIL processor analysis determines the format associated with a search engine, and the information from a QRIL record that is needed to generate a standardized rewrite in the format acceptable to the search engine. While method 200 describes one example implementation of QRIL processor analysis and standardized query generation, additional details and other aspects of QRIL processor operation which may be used in different embodiments are described below with respect to QRIL processor 540 of FIG. 5.

As part of operation 245, the query type included as an element of the QRIL record may be identified by the QRIL processor 140 and various different processing operations may be implemented based on the query type of the QRIL record. Details associated with different query types are discussed below, and the characteristics of different query types may be used by the QRIL processor 140 during operation 245. Following an initial analysis of a QRIL record in operation 245, rewrite conflicts and precedence rules may be used to generate one or more rewrites in operations 250 through 290 as detailed below.

In addition to the different types of query rewrites discussed above, certain QRIL records and associated rewrites may involve recursive rewrites. Operation 250 checks a QRIL record for settings associated with recursive rewrites. The term recursive rewrites refer to chains of rewrites that may occur when a rewrite value associated with the first rewrite is a trigger associated with a second rewrite. For example if a first direct rewrite has a trigger "fone" and a rewrite value "smartphone" and a second direct rewrite has a trigger "smartphone" and a rewrite value "phone model #12345," then a chain of rewrites may result in the token "fone" in a user's query being rewritten to "phone model #12345." The check of operation 250 may involve a QRIL record element which indicates whether recursive rewrites are allowed or enabled for the rewrite associated with a QRIL record. Certain QRIL records may, in certain embodiments, include an element which specifically allows or specifically prohibits a rewrite value to be used as a trigger for further rewrites. In other embodiments, system rules may determine whether recursive rewrites are allowed. If recursive rewrites are allowed, the system may proceed to analyze any related QRIL records or previously generated standardized rewrites. For example if the rewrite with the trigger "fone" is part of a QRIL element which indicates that recursive rewrites are not allowed, then the second rewrite which is part of the set of standardized query rewrites is ignored during the generation of the standardized rewrite for this QRIL element. If however, recursive rewrites are allowed, then in operation 255 the QRIL processor 140 will check for rewrites that have a trigger which match all or part of the rewrite value for the QRIL element being processed. This may include checking all QRIL elements in QRIL record database 130. This may also involve checking all standardized rewrites from a current set of standardized rewrites 142. If applicable rewrites are found during operation 255, then the recursive rewrite is analyzed in a repeat of operation 245. The recursive rewrite is then checked for a double recursive rewrite in a repeat of operation 250. This process proceeds in a nested fashion until there are no further recursive rewrites, or until a system limit on recursive rewrites is reached. In certain embodiments, a single QRIL may have two nested rewrites from the same trigger. For example, if the first QRIL has a rewrite value of "Belgian double chocolate," and applicable triggers exist for both "Belgian" and "double chocolate," then if no other constraints prevent it, a nested rewrite for both "Belgian" and "double chocolate" may be analyzed, and their respective rewrite values used in the creation of the standardized rewrite.

In operation 260, the QRIL processor 140 may determine if any conflicts exist with the rewrite. Examples of conflicts include rewrites with the same trigger and different rewrite values. Operation 260 may involve QRIL processor 140 checking the rewrite for the current QRIL record against other QRIL records, against previously generated standardized rewrites that have already been incorporated into a set of standardized rewrites by the QRIL processor 140, or both.

If a conflict is identified, then in operation 265, the system analyzes the rewrites that are in conflict and applies precedence rules to resolve the conflict. Conflict resolution is required when the same trigger is associated with multiple different rewrites, and one rewrite conflicts with one or more of the rewrites. This may occur for example when a phrase rewrite and a direct rewrite have identical triggers with the same tokens. In such a circumstance, the phrase rewrite will typically match only a subset of the items that are matched by the corresponding direct rewrite. The system may resolve such conflicts with fixed rules. One embodiment provides that when a phrase rewrite and a direct rewrite include the same triggers, the direct rewrite is dropped, and the phrase rewrite is used by the system as providing the more succinct set of matches. Another embodiment assesses an expected set of results from two conflicting rewrites. The rewrite with the greater amount of rewrite detail which would be expected to return a narrower search results is selected. This may be assessed based on a number of characters or tokens in a rewrite value. This may also be assessed based on a metaflag value or other related information in a QRIL record. For example, a QRIL record may include a metaflag element for a precedence score or a detail value. Such a metaflag value may be used to resolve which QRIL record when a trigger is part of a search query, or an order in which a trigger is applied.

In one potential embodiment, certain conflicting query types are given precedence based on query type. In one potential embodiment, a whole query rewrite is given priority, as a whole query rewrite is an exact match to a user query string. The whole query rewrite includes a specific rewrite value with no derivative transformations or recursive rewrites, as the whole query rewrite is specifically tailored to an exact user query. The whole query rewrite thus is a priority rewrite, and any conflicting rewrites of a different type will not be executed in view of the precedence of the whole query rewrite. Because a whole query rewrite has a trigger which is an exact match to a user query, conflicting whole query rewrites may raise an error flag to be output to a system operator. In embodiments without such a conflict output error, the whole query conflicts may be resolved as described above, with the rewrite value containing the greatest amount of detail taking precedence.

Continuing with the example embodiment of conflict resolution discussed for whole query rewrites, in this embodiment, a token adjustment rewrite may then take precedence after a whole query rewrite, and a phrase rewrite may take precedence over a direct rewrite as described above. Any rewrite conflicts between rewrites of the same type may be resolved as described above in favor of the narrowest rewrite value. If derivative or recursive rewrites are allowed, such that rewrite values a rewritten query may act as a trigger for additional rewrites, then each level of recursion following a completed rewrite may use the same rules discussed above to resolve rewrite conflicts at each level of derivation.

When the conflict resolution is confirmed, all of the related conflicting rewrites are updated in the set of standardized rewrites as part of operation 275. In certain embodiments, this may involve removing one of the rewrites from the set of standardized rewrites. In other embodiments, this involves selecting the rewrite order, such that the first rewrite will be used, and after the trigger is transformed with the rewrite value, the other trigger will no longer apply. In one potential embodiment of a set of precedence rules, whole query rewrites have precedence over all other rewrites, direct rewrites have precedence over phrase rewrites and token refinements, and phrase rewrites have precedence over token refinements. Rewrites of the same type may be given priority based on the level of detail (e.g. a number of characters, tokens, or symbols) in the rewrite value, with a higher level of detail (e.g. more characters) having priority over a lower amount of detail. In certain embodiments, a QRIL may have a priority metaflag element that is used to resolve conflicts between rewrites of the same type.

In operation 270, after all elements of the QRIL record have been considered and any conflicts have been resolved, the standardized query rewrite is generated by QRIL processor 140. In operation 280, a set of standardized query rewrites is updated to include the new query rewrite. In operation 285, the QRIL processor 140 checks to see if any additional QRIL records are to be considered and used to generate standardized rewrites that will be used as part of the set of standardized query rewrites. The process performed by QRIL processor 140 then repeats operations 245 through 285 until all applicable QRIL records are considered.

When all QRIL records are finished being considered, a set of standardized rewrites 142 is output from QRIL processor 140. In various embodiments, this may be an output communication from a cache or local memory of QRIL processor 140. In other embodiments, this may be a final adjustment made by QRIL processor 140 to a text file stored in a separate memory, where the text file comprises the set of standardized rewrites 142. In operation 290, the set of standardized query rewrites is provided to search engine 160. In operation 295, the search engine operates using the set of standardized query rewrites to generate search results in response to queries received from client devices. The search engine proceeds until a system update occurs as part of operation 298. When a system update occurs, the process may repeat from operation 230, with generating new QRIL records, processing the QRIL records to update or generate a new set of standardized query rewrites, and to update the set of standardized query rewrites used by the search engine 160.

Figure 3A:
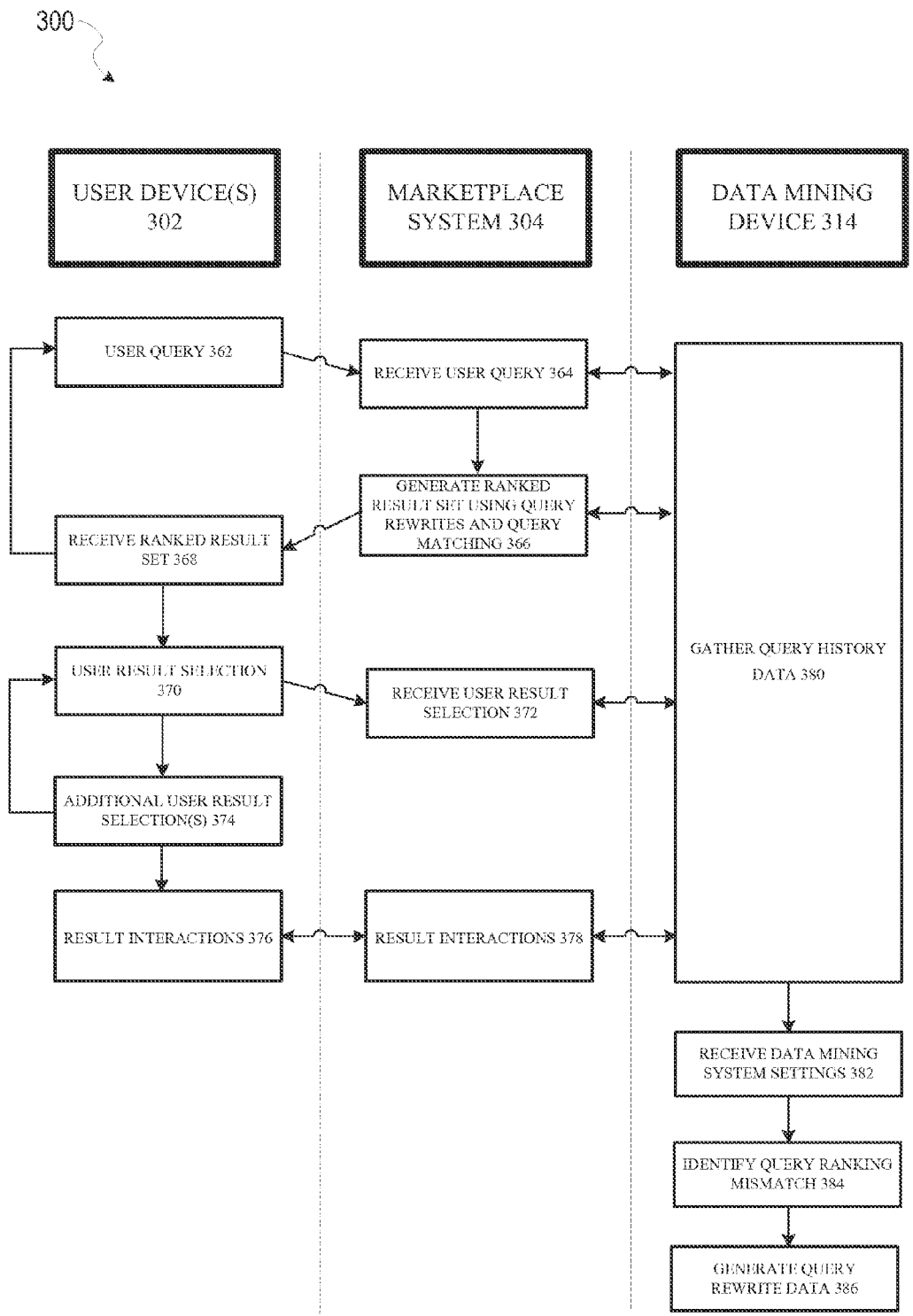
FIG. 3A is a chart illustrating the gathering of query history data that may be used for automatic generation of query rewrite data according to certain example embodiments.
Figure 3B:
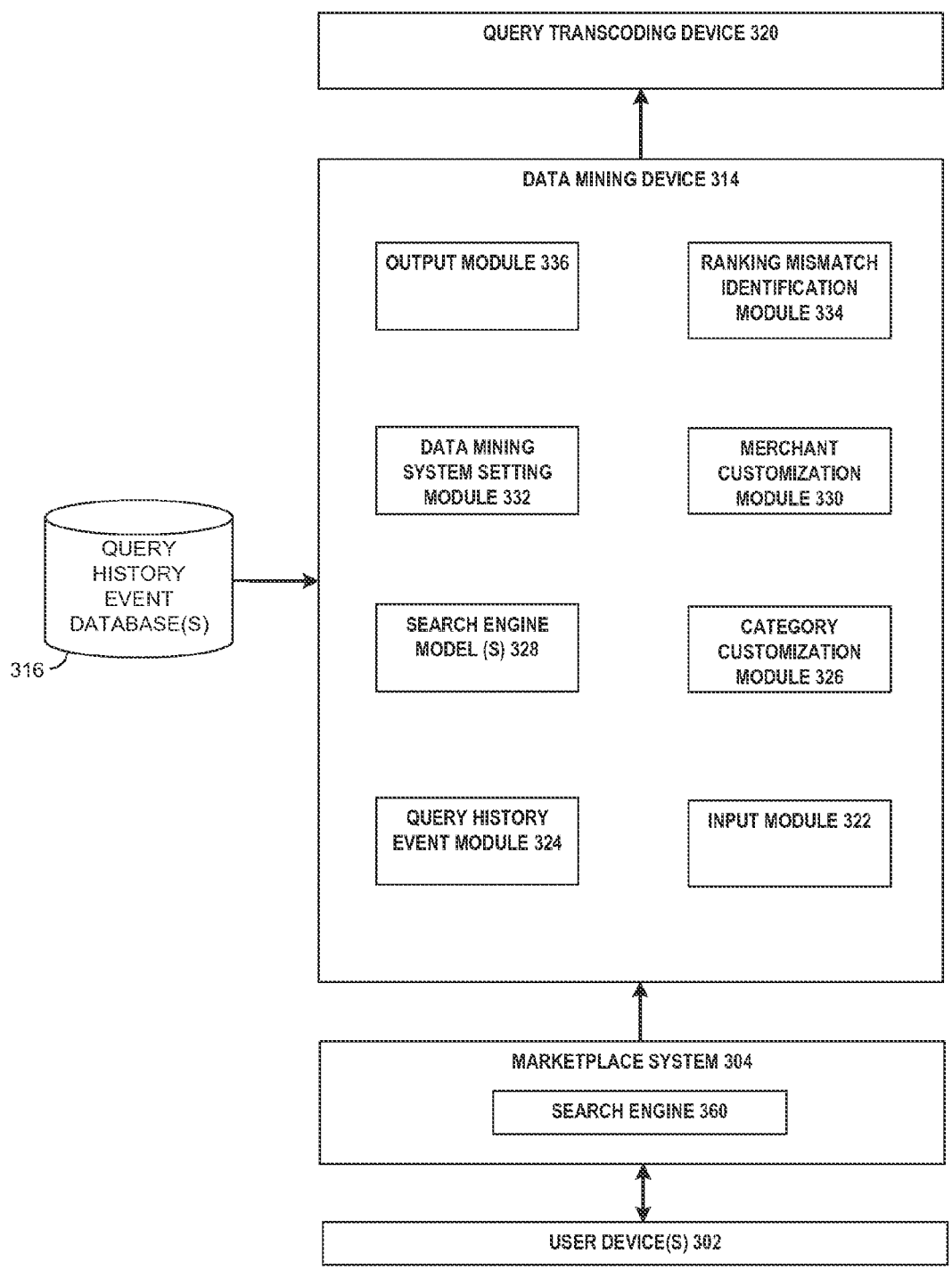
FIG. 3B is a block diagram illustrating a data mining device for automatic generation of query rewrite data according to certain example embodiments.

FIG. 3A illustrates a flowchart of a method 300 that may be used with user devices 302, a marketplace system 304, and a data mining module 314. FIG. 3B illustrates one example implementation of a data mining device 314 which may interact with a marketplace system having a search engine 360 to generate query rewrite data for query transcoding device 320. Such query rewrite data may be based on query history event data derived from communications between user devices 302 and marketplace system 304, and stored in a query history event database 316. In certain embodiments, user devices 302 may be similar to client machines 1110 and 1112 discussed below. In certain embodiments, marketplace system 304 includes a search engine, may be similar to network 1102 with search engine 1123, or may include a search engine similar to system 900. In certain embodiments, data mining device 314 may be similar to data mining module 114.

Operations 362 through 380 show data mining device 314 gathering query history data for use in automate generate of query rewrite data that may be used to generate QRIL records. Operation 362 involves a user query generated by a user device 302. In operation 364, the user query is received by marketplace system 304, and in operation 366, marketplace system 304 generates a ranked result set using a search engine. The ranked result set is sent to the originating user device 302 in operation 368. The user device may then generate another user query and repeat the process again from operation 362, or the user may select an item from the ranked results as part of operation 370. Because marketplace system 304 is not simply a search engine but also includes marketplace elements, the marketplace system 304 has more information than just search information to send to data mining device 314 as part of an operation for gather query history data 300. Marketplace system 304 receives the user selection of an item from the set of ranked results in operation 372 and this allows marketplace system 304 to send not only user queries from receive user query operation 364, rank results generated by the search engine from generate ranked result set using query rewrites in query matching 366, but also any user selections resulting from the user receiving response to a search query received in operation 372.

In certain systems, a user operating one or more user devices 302 may select any number of items from multiple sets of ranked results, and operation 374 comprises user selection of additional results. Further, any number of complex interactions may occur between user device 302 and marketplace system 304 following an initial user query. Particularly if marketplace system 304 is able to identify a chain of user queries, sets of ranked results, user selection of items from a set of ranked results, and subsequent actions such as a purchase or a communication to a merchant operating within marketplace system 304, this information may all be aggregated and associated as part of a single query history event. All of the available information from such query history events may be gathered as part of gather query history data 380. As many such query history events associated with similar or identical query terms are received, they may be stored in a query history event database, and analyzed by data mining device 314 to identify mismatches between certain queries and the set of ranked search results generated by the search engine 360 of marketplace system 304.

In operation 382, data mining device 314 may receive data mining system settings. Such settings may be received from a system operator either as part of default system settings, as part of targeted settings for automatic query rewrite generation, as part of targeted settings from a merchant or category manager having system privileges associated with a system accounts such as accounts generated by registration with transcoding modules and devices in operation 205 of method 200.

Data mining device 314 may then, in operation 384, analyze query history data to identify query ranking mismatches, and in operation 386, data mining device may generate query rewrite data associated with the query ranking mismatch. This query rewrite data may then be stored for manual approval by an operator or account holder associated with the data mining device, or may automatically be sent to a query transcoding device 320 for use in generating a QRIL record. In certain embodiments, query transcoding may be integrated with data mining in a single device. Similarly, any aspect of query transcoding device 320, data mining device, or query history event database 316 may be integrated as part of a single system or device, and may be integrated with a network marketplace or publication system such as marketplace system 304.

FIG. 4B illustrates one particular implementation of a data mining device 314 that may be used with other aspects of systems for standardized query rewrite generation described herein. Data mining device 314 includes an input module 322. Input module 322 may include any hardware, firmware, or software elements needed for reception of query history data from a networked system such as marketplace system 304. Query history event module 324 parses data received at input module 322 to identify the type of data received, which may include a query value, sets of ranked search results, or other user interaction data. Query history event module 324 further determines associations between received query history data elements received to identify query history events and to associate query history data with a particular query history event. Query history events may then further be associated based on terms in an initiating user query, category type, or other classification information associated with query history events. The query history data may then be stored in query history event database 316.

In certain embodiments, this association may be generated by a module operating on a user device. Such a module may track user actions associated with a particular query, such that a query generated by a device, and a purchase made from the device may be compared against category lists. If values or terms of the search query are associated with a first category and a purchased item is also associated with the first category, the query history data elements associated with both the user query and the purchase may be associated with a first query history event.

Similarly, a user may register with an account on a publication or marketplace system. When a user sends and account name and password to the system, the system may place a cookie on the device in order to track actions by the user. Additionally, communications to and from the system may be tracked by the system. Multiple user queries associated with a category and user selections from a ranked result set may be identified from communications between a user device and the system using account details and login information. Such actions tracked by a system may be aggregated as a query history event. In certain embodiments, query history events may be limited to actions that occur within a certain time period of other actions. In such embodiments, different query history events identified as associated with a single category may be associated within an event category set.

As described herein, a category is an identifier that is used to refer to different types of products or services that may be offered by or related to actions that a user may take in association with a publication system or marketplace network. In certain embodiments, such systems may use a category tree to structure aspects of a site. Such a category tree may include may categories in multiple nested levels. One branch of a category tree, may include a top level "motors" branch. A first level of sub-branches of "motors" may include "cars and trucks", "motorcycles," "boats," and "airplanes" as separate branches, along with other first level sub-branches. Each of these first level sub-branches may include second level sub-branches, and so on, with any number of branches and sub-branches in the system. Each branch or sub-branch may be associated with a set of terms that is used to identify when a product or service may be associated with the branch or sub-branch. A product or service related to the publication or marketplace system may have a primary category and/or any number of categories associated based on descriptions for the product or service. Such a category tree may be used to identify query history events by determining that query history data elements occurring within a certain time frame and associated with a single user are part of a single query history event.

Ranking mismatch identification module 334 analyzes query history data in query history event database 316 using criteria from merchant customization module 330, data mining system settings module 332, and/or category customization module 326, along with information about search engine 360 from search engine models 328 to generate query rewrite data. For example, if a merchant with a storefront in marketplace system 304 has access to merchant customization module 330 through a previous system registration, the merchant may input a target setting that will be used to automatically generate query rewrite data. An example target setting may be to have search results for "Brand A phones" return ranked result sets with items matching a particular model of Brand A phones, such a "Brand A Model X." This may be specifically used, for example, if a new phone has just been released, and the search engine is still returning items in ranked results sets for an old version of the phone. Ranking mismatch identification module 334 may analyze data from query history event database 316 to identify searches associated with "Brand A." Information from query history event database 316 may additionally be used to determine the types of items that are returned from search engine 360 in response to searches with "Brand A." This information along with information about search engine 360 from search engine models 328 may be used to identify trigger values, rewrite values, constraint data associated with the merchant and the merchant's storefront, and other data as part of query rewrite data. Such trigger values, rewrite values, and constraint data may be generated from a combination of query history event database 316 data, data and rewrite values provided with target settings, and standardized rewrite and trigger settings that may be part of data mining system settings 332.

As described above, the identification of such a mismatch may be performed by a publication or marketplace system storing query history events. Query history events associated with a specific category may further be identified by particular terms or values in user queries. As a system may store many instances of user queries including a certain term, the system may begin to identify statistical properties associated with the search results sent to a user, and any selections made by a user. This information may be stored in a database. If a threshold percentage of users does not select a result from a top X number of search results on a consistent basis, then a mismatch may be identified. Such threshold values related to user percentages, top numbers of search results, and mismatch consistency may be selected by a user operator. Such values may also be set on a per category, per storefront, or any other basis within the system.

The query rewrite data may then be sent to query transcoding device 320 for generation of QRIL records. As standardized rewrites are propagated to search engine 360, and marketplace system 304 sends updated query history data to query history event database 316, the target settings from the merchant may be compared with actual percentages of items in sets of ranked results that include "Brand A Model X" as well as a comparison of what items are actually selected by users, and this information may further be used to automatically update query rewrite data and associated QRIL records in an automatic feedback loop.

Such target setting may be a percentage of items in sets of ranked search results including a particular term. Such a target setting may be to provide a certain mix of items in the top ten items of a set of ranked search results, such as an even number of items from two different categories. Any other such criteria for the desired properties of sets of ranked search results may be part of such a target setting. If the target is met by existing data in query history event database 316, then ranking mismatch identification module 334 may determine that there is no mismatch between the target and the system operation, and ranking mismatch identification module 334 may periodically compare the target with new information in query history event database 316.

The automatically generated query rewrite data may then be sent via output module 336, which may be any hardware, firmware, or software elements needed for communication similar to and/or integrate with input module 322, to query transcoding device 320. In other embodiments where data mining device 314 and query transcoding device 320 are integrated in a single system, elements for rank mismatch identification and query transcoding to generate a QRIL record may also be integrated to directly create a QRIL record from query history data using the query history data as query rewrite data for query transcoding.

Category customization module 326 may function to receive target settings that apply only to queries that are associated with particular categories in marketplace system 304. For example, if marketplace system 304 provides product listings based on categories, with the categories used to organize search results, category customization module 326 may be used to provide target settings for items in sets of ranked search results. As described above, these target settings may be used to automatically generate query rewrite data that is used for QRIL records and associated standardized query rewrites in search engine 360. The target settings may also be used to monitor changes in query history events based on the automatically generated query rewrite data, to monitor the impact of this data, and to make or undo changes if the impact is not in line with the target settings.

While merchant customization module 330 may allow target setting on a per merchant basis or a per storefront basis, and category customization module 326 may enable target settings on a per category basis, data mining system settings 332 may provide basic operation targets for the entire system. This may, for example, limit a total number of sets of query rewrite data that may be generated, in order to avoid flooding search engine 360 with an excessive number of automatically generated query rewrites. This may also include feedback settings for monitoring the impact of automatically generated query rewrite data as it propagates through the system to generate standardized query rewrites and thus to impact the sets of ranked search results seen in query history events over time. Such an impact may be quantified by storing data associated with user selections for ranked search results provided to users. The impact may be determined by identifying changes in user selections associated with a single query value or phrase over time.

Search engine models 328 may be used to generate specific trigger values, rewrite values, or metaflag values in query rewrite data generated by data mining device 314. For example, in certain embodiments, data mining device 314 may gather data from multiple search engines that operate using different matching parameters to generate sets of ranked search results. Search engine models 328 may store information about the algorithms used by different search engines, and may include multiple models for a single search engine. Models for different search engines may, for example, include information about the exact set of standardized query rewrites in use by a search engine at a particular time. This may include any information that may be used to predict how a query rewrite will impact sets of ranked search results. Query rewrite data generated by data mining device 314 may be based on an analysis of how a particular rewrite will interact with aspects of a search engine such as ranking models 910, ranking factors 920, items in a search index 914, or any other aspect of a search engine. This information may be modeled by or accessible through an interface to a networked model device operating as part of search engine models 328.

A single query history event may thus be a set of actions identified by marketplace system 304 and sent to data mining device 314 that originate from an initial user query, with subsequent user queries, sets of ranked results, user result selections, and result interactions related to the initial user query by topic, category, product type, keyword, brand, or any other such relationship identified by a user. Multiple query history events may be associated within a query history event database Additionally, a system operator or merchant associated with marketplace system 304 may wish, in certain embodiments, to influence the ranked search results associated with certain types of queries, but may not have sufficient information to generate the query rewrites to achieve the desired results. In such embodiments, a data mining device may use input search result goals from a merchant or system operator to automatically generate rewrites using information from a query history event database along with feedback about any ranking mismatches created by the input search result goals to automatically generate and update query rewrites.

Figure 4:
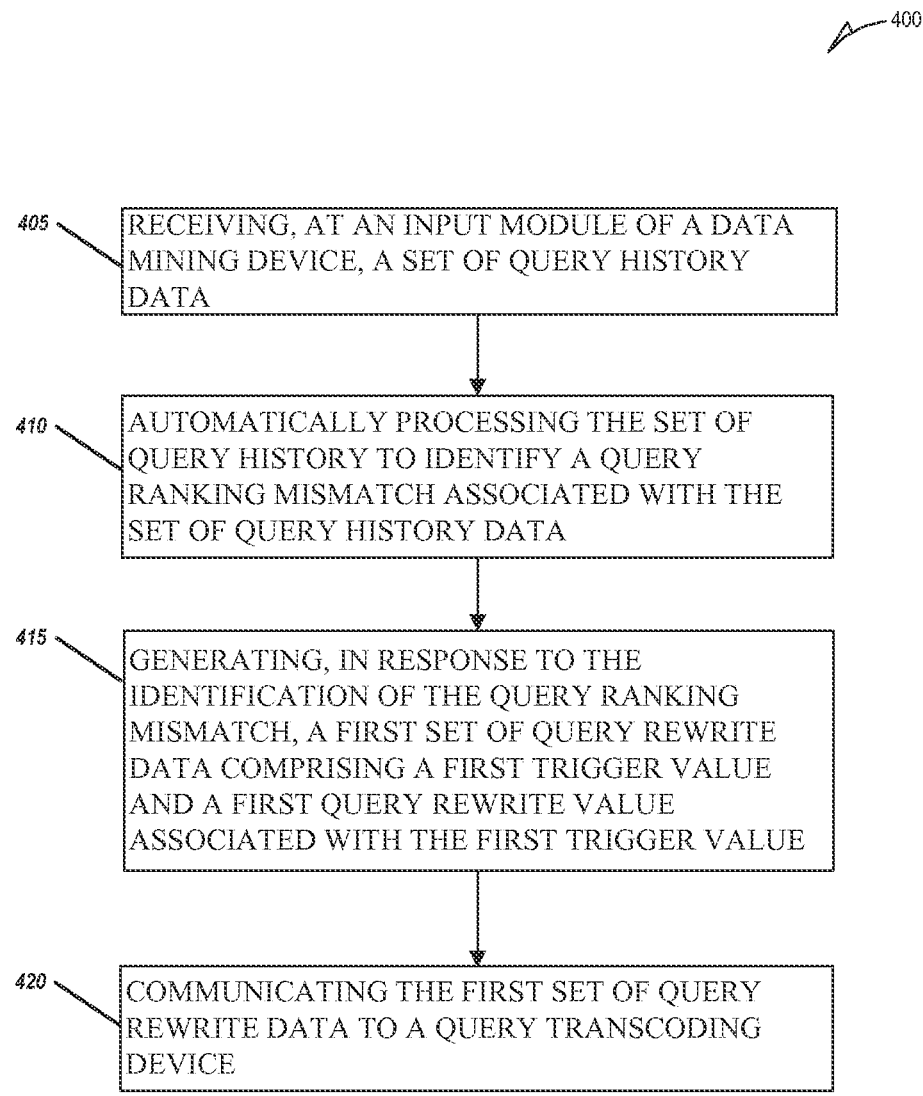
FIG. 4 is a flowchart illustrating an example method for generating query rewrite data according to certain example embodiment.

FIG. 4 illustrates a method 400 for automatic generation of query rewrite data using query history data. For the purposes of illustration, method 400 is described with respect to elements of FIG. 3. In various other implementations, method 400 may be used with a variety of different systems including any system described herein.

Operation 405 involves receiving, at an input module 322 of a data mining device 314, a set of query history data such as the query history data gathered in operation 380 of FIG. 3A. Query history data as described here may include any number of user queries, ranked result sets, user selections, and other interaction data. Query history data includes at least information from a first user query and an associated first set of ranked results. The first user query and the first set of ranked results may be received at the same time as part of a single communication, or may be received separately as separate communications.

In certain implementations, receipt of all or part of the set of query history data is associated with parsing the set of query history data to identify a query history event associated with the query value, the set of ranked search results, and the set of user interaction data associated with the query value. If parts of the set of query history data are received in separate communications, each part may be parsed as it is received, with each part stored in a query history database as it is processed. Each part may be associated during processing As mentioned above, a query history event refers to a set of interactions that may be associated with one or more user actions with a connected theme or search. For example, a user searching for a particular product may use multiple search queries and multiple item selections prior to purchasing an item from a marketplace system. Each search and item selection that is related to the purchase may be part of a single query history event. In certain embodiments, a time limitation may be placed on individual events such that elements of a query history event must occur within a certain time, such as within a five minute window. In other embodiments, each event must occur within a predefined time period of the most recent event. In other embodiments, each element must be associated with a certain search category defined by a search engine.

The system may then associate a query history type with the query event. A query history type may be defined be one or more words in a user query associated with the query history event. The query history type may be defined by a purchase or item section that is part of the query history event. The query history type may be defined by a bottom level search category associated with a certain number of elements of the query search history, with the bottom level search category defined as part of a category tree of the search engine. The query history type may then be stored as part of the query history event in the query history event database. The query history event database may store any number of query history events associated with any number of query history types.

Operation 410 then involves processing, using at least a first processor similar to processor 1202, the set of query history to identify a query ranking mismatch associated with the set of query history data. Examples of query mismatch are described above, and may be identified by comparing query history events or statistical properties of query history events of a certain query history type against target settings provided by a system operator or a system user such as a merchant with access and system permissions to set targets for automatic generation of query rewrite data and associated standardized rewrites.

In one embodiment, processing the set of query history to identify the query ranking mismatch comprises receiving a first target setting, the first target setting identifying the first query type and a set of target ranked result characteristics associated with the first query type and identifying a plurality of query history events comprising the first query history event in a query history database, the plurality of query history events being associated with the first query type. The mismatch identification may then involve determining a first set of ranked result characteristics associated with the plurality of query history events and determining that the first set of ranked result characteristics do not meet the target ranked result characteristics. Identification of the query ranking mismatch is then based on the determination that the first set of ranked result characteristics to not meet the target ranked result characteristics.

Operation 415 then involves generating, in response to the identification of the query ranking mismatch, a first set of query rewrite data comprising a first trigger value and a first query rewrite value associated with the first trigger value. In one embodiment, generating the first set of query rewrite data comprises identifying a difference between the first set of ranked result characteristics and the target ranked result characteristics, and then determining that the first trigger value and the first query rewrite value are associated with the difference between the first set of ranked result characteristics and the target ranked result characteristics. Such an association may be based on a table provided as part of target settings. For example, a merchant or system operator may identify multiple sets of rewrite trigger values and associated rewrite values to be used if certain characteristics of sets of ranked search results do not meet certain criteria. Different trigger values and associated rewrites may be associated with different elements of a multi-faceted criterion. In other embodiments, the association between the first trigger value and the first query rewrite value may be based on one or more search engine models 328 that may be used to determine the impact of particular trigger values and query rewrite values on ranked search result sets.

Operation 420 then involves communicating the first set of query rewrite data to a query transcoding device 320. In certain embodiments query transcoding device 320 and data mining device 314 may be the same device. In such embodiments, the communication of the first set of query rewrite data to a query transcoding device comprises internal communications to systems or modules of the integrated device that generate a QRIL record from the query rewrite data identified in the operations above.

Once query rewrite data is generated, a transcoding device such as query transcoding device 120 or query transcoding device 320 may be used to generate QRIL records. Such a query transcoding device may receive query rewrite data from data mining device 300. The set of query rewrite data may include any information related to products or searches, and includes constraint data, metaflag data, and any other related query rewrite data. The query rewrite data includes information that may be used to identify a first trigger value and an associated first query rewrite value which, together with the first trigger value, make up the core information that will become the rewrite. The constraint data which may be used to identify appropriate limitations on a related rewrite. The metaflag data includes any information or data relevant to a rewrite type other than the actual trigger and rewrite values. The metaflag data may also include data indicating whether recursive rewrites are allowed for a related rewrite, data that may assist in identifying a category which may be associated with the rewrite if a category constraint is not explicitly identified, or other categories other than an explicitly identified category that may be associated with a rewrite.

The query information is processed to identify the first trigger and the first query rewrite value. This processing may be done using data parser module. The data parser module may be a text parser or other computational parser that analyzes the query data to build a data structure giving a representation of the query data. The data parser analyzes the characters or symbols in query data to identify a trigger and a rewrite value as the core part of a rewrite that will be the basis of a QRIL element. The data parser may also use a token or character library to identify matching tokens or strings of characters within the query data that are associated by the library with certain metadata, constraints, or other elements of a QRIL record.

The first set of query data may be analyzed to identify a first query rewrite type associated with the first set of query rewrite data from a plurality of query rewrite types. In one embodiment, the data structure generated by a data parser module may be used in conjunction with a plurality of rewrite type identifier modules to identify a query type associated with the data query.

In addition to the identification of a trigger in the query rewrite data and the identification of the query rewrite type, additional embodiments may analyze the query rewrite data for other information. This other information may include details used to create metaflags, details used to identify constraints that tell a system when a rewrite will or will not be used, or other such information. Additional details related to such metaflags are discussed below with respect to FIG. 5. Such information may be gathered using the structure identified by data parser module in conjunction with any number of other modules of a query transcoding device. This includes a constraint identifier module, which may be particularly adapted and configured with analysis systems to identify constraints on a particular rewrite. Examples of such constraints include application of a rewrite only when the query originates from a client device in a particular country or other geographic area, application of a rewrite only when a query originates from a particular website marketplace, or any other such constraints.

A first query rewrite input language (QRIL) record is then generated from the query rewrite data, and the QRIL record is stored in a QRIL record database with a plurality of QRIL records. The QRIL record comprises at least a trigger value and the query rewrite value. The QRIL record may be generated by a QRIL generation and formatting module.

In certain embodiments, then, an entire feedback loop may be part of an implementation. Such an embodiment may include method 400 described above, along with a transcode method of analyzing the first set of query data to identify a first query rewrite type associated with the first set of query rewrite data from a plurality of query rewrite types and generating a first query rewrite input language (QRIL) record from the first set of query rewrite data, wherein the first QRIL record comprises the first trigger value, the first query rewrite value, and a first metaflag element that identifies the first QRIL record as associated with the first query rewrite type. The QRIL record generated may be stored in a QRIL record database with a plurality of QRIL records.

A standardization method may then further be part of a particular implementation, with a QRIL processor module accessing the QRIL record database to retrieve the first QRIL record generated from the query rewrite data automatically created by data mining device 314. This first QRIL record may be processed using the QRIL processor module to generate a first standardized rewrite, and a set of standardized rewrites may be updated using the first standardized rewrite to generate an updated set of standardized rewrites.

A query factorization module of a search engine 360 may then receive the updated set of standardized rewrites, and may use the updated set of standardized rewrites when a search engine user query is received from a user device 302 at search engine 360 of marketplace system 304.

The search engine rewrites the first search engine user query using the first standardized rewrite. This may, as described below, be part of operation of a query factorization module. A first set of ranked search results for the first search engine user query may then be generated using the first standardized rewrite, and may be communicated from the search engine to the first client device.

The first user query and the first set of search results may also be sent to data mining device 314 a second set of query history data. As described above, additional interactions associated with the first user query may be gathered and processed by data mining device 314 as another query history event. Further, this particular query history event may be identified as being generated based on an automatically generated set of query rewrite data. This may occur if, for example, the system tracks the standardized rewrite generated from a QRIL record based on an automatically generated set of query rewrite data. Data mining device 314 may then analyze the impact of the QRIL record based on the automatically generated set of query rewrite data to determine if the impact improves system operation according the target settings that were used to identify an initial mismatch which initiated the automatic generation of query rewrite data. Improvement may be identified by, for example, determining that a difference between a set of target criteria and a set of statistical data identified for the original data in query history event database 316 prior to the new QRIL record being used in the system is smaller than the equivalent difference between the same criteria and a set of statistical data identified since the new QRIL record was implemented in the search engine 360. Such statistical data may, for example, describe user selections associated with certain search terms or phrases, including how such user selections change over time. In a simple example, a first term has two possible search results. Over a first time period, 10% of users select a first search result, 30% of users select a second search results, and 60% over users make no selection. The system may implement a query rewrite associated with the first term using rewrite values from content associated with the search results. Over a second time period following the implementation of the query rewrite, the system may determine that 50% of users initiating a user query with the same term above now select the first search result, 20% of users select the second search result, and 30% of users make no selection. Such a change may be associated with a query rewrite as an impact. Additional impacts may be identified. For example, the system may identify purchases associated with the term made within an hour to be 10% during the first time period, and 15% during the second time period.

Figure 5:
FIG. 5 illustrates one example implementation of a QRIL record that may be generated from query rewrite data and used with various embodiments.

FIG. 5 illustrates one example implementation of a QRIL record that may be used with various embodiments. QRIL record 500 of FIG. 5 illustrates an example of a QRIL record having a number of additional elements. In certain embodiments, QRIL record 500 may be generated by QRIL generation and formatting module 436 in an implementation of operation 320. QRIL record 500 includes trigger element 540 and rewrite value element 550. Additionally, QRIL record 500 includes a plurality of constraints 510, including category element 512, site element 514, and country element 516. Category element 512 may identify one or more categories associated with an e-commerce search engine to which a query rewrite associated with QRIL 500 will apply. As described in additional detail below, a search engine may categorize a user query based on categories in e-commerce search engine category tree based on details of these are query along with other information about the user or the users client device. This category information may additionally be used with query rewriting. One example of this use is the identification of a category constraint identified by category element 512.

Similarly a search engine may have information about a country or other geographic location from which a user query originates and this may be used with country element 516 to constrain certain query rewrites to be used or not be used when a query originates from the location identified by country element 516 of a particular QRIL record such as QRIL record 500.

Site element 514 may identify a website, merchant storefront, or other e-commerce portal which may act as another constraint on a particular query rewrite. For example in one embodiment, system 700 may host a plurality of e-commerce marketplaces via the marketplace application's 720. Each marketplace associated with a marketplace application 720 may have a site identifier. That site identifier may be used as a value for site element 512 in QRIL record 500. This may enable an operator of a particular marketplace application 720 to create QRIL record 500 and use site element 514 to constrain QRIL record 500 to apply only to queries originating from the merchants marketplace application 720 as identified by the value of site element 514.

Metaflags 520 of QRIL record 500 may include QRIL elements for any number of different types of information. In the QRIL record 500 of FIG. 5, metaflags 520 are used to identify the query rewrite type for the rewrite associated with QRIL 500. This is done by providing an element for each query rewrite type. QRIL record 500 thus includes subkey propagation 524, which may be used to indicate whether multiple rewrites may apply to tokens of a trigger, whole query element 526 which may indicate a whole query rewrite type, direct element 528 may indicate a direct rewrite type, token refinement element 534 may indicate a token refinement type, and phrase element 536 may indicate a phrase rewrite type.

In addition to the query rewrite type, meta flags 520 may also indicate other details to be associated with the rewrite of QRIL record 500. Exclude element 530 may be used to indicate that certain rewrite types are negative rather than positive. This means that the rewrite is done to exclude search results containing rewrite value rather than to search for results containing the rewrite value. A derived rewrite disabled element 532 may be used to identify whether recursive rewrites are allowed to use the rewrite value of rewrite value element 550 as a trigger for a subsequent rewrite. Category match 539 and phrase categories 538 may identify categories in the category tree of an e-commerce search engine to be used with a search performed with the rewrite value of rewrite value element 550. In other embodiments, any number of other elements may be used as part of a QRIL record such as QRIL record 500.

Figure 6:
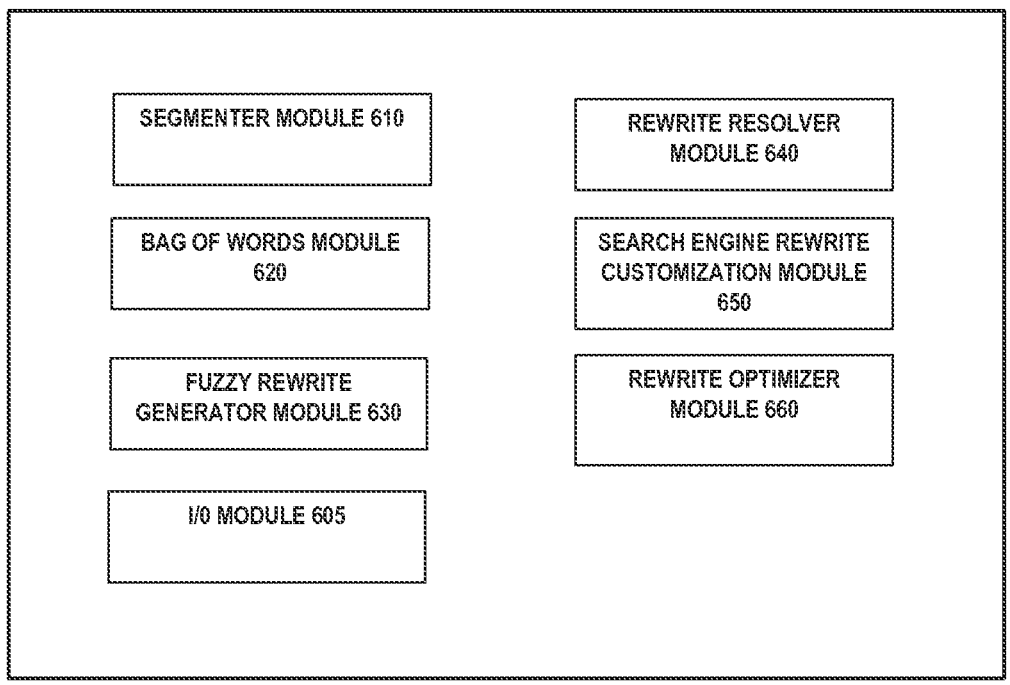
FIG. 6 illustrates a QRIL processor device according to one example embodiment.

FIG. 6 is a block diagram for one example embodiment of a QRIL processor device 600. In various embodiments, QRIL processor device 600 may be similar to QRIL processor 140. QRIL processor 600 is detailed below with various component modules. Such modules may be implemented as software or firmware operating with one or more processors and memory hardware components that are part of QRIL processor device 600. Such modules may also be implemented as firmware, electronic hardware, or any combination of software, firmware, or hardware. While QRIL processor device 600 is detailed below with various modules, it will also be apparent that in various embodiments, the elements of QRIL processor may be combined or structured in different ways in different example embodiments, and further, QRIL processor 600 may be implemented as part of a larger system, or may be implemented as multiple distributed systems.

QRIL processor device 600 takes QRIL records and uses them to generate standardized rewrites that may be used by a search engine. In certain embodiments, this involves taking QRIL record elements such as metaflag elements that may not be directly usable by a search engine, and using these QRIL elements to generate a standardized rewrite in a format that is usable by the search engine, and following the precedence rules using the execution structure of the search engine. In certain embodiments, the QRIL processor device 600 may do this for different search engines with completely different query formats, acceptable semantic structure, and execution structure. A QRIL processor such as QRIL processor device 600 or QRIL processor 140 may thus be considered a complement to QRIL generation performed by query transcoding device 120. Query transcoding device takes non-standard rewrite information and uses this rewrite information to generate standardized QRIL records. QRIL processors such as QRIL processor 600 then take QRIL records, and create rewrites customized for a particular search engine using the standardized information in the QRIL records. A set of standardized rewrites 142 that may be generated by a QRIL processor 140 or QRIL processor device 600 for search engine 160 are standardized to follow the precedence rules of the system. In certain embodiments, different sets of standardized rewrites may be generated by a single QRIL processor for two different search engines. As such, a second set of standardized rewrites using the same QRIL records for a second, different search engine may generate a second set of standardized rewrites with a completely different semantic structure and format than a first set of standardized rewrites generated using the same QRIL records. The second set of standardized rewrites, however, is used to present rewrites following the same precedence rules and structure as the first set of standardized rewrites. The difference between the sets of standardized rewrites for different search engines simply accommodates different semantic structures and formats of different search engines. This may also allow updates to rewrites by updating a QRIL processor if the function of a search engine is updated, without a need for manual or custom checking of individual rewrites for impacts due to the search engine update.

QRIL processor device 600 includes an input/output (I/O) module 605, segmenter module 610, bag of words module 620 rewrite resolver module 640, fuzzy rewrite generator module 630, search engine rewrite customization module 650, and rewrite optimizer module 660.

I/O module 605 comprises communication circuitry that enables QRIL processor device 600 to communicate with other devices such as QRIL record database 130. This enables the QRIL processor device to retrieve QRIL records for processing. In certain embodiments, all QRIL records for processing may be retrieved and stored at a memory of the QRIL processor device 600. In other embodiments, individual QRIL records may be retrieved serially, along with any other QRIL records or other information associated with a QRIL record that is needed to generate a standardized rewrite associated with a QRIL or otherwise determine that no rewrite is to be generated for a particular QRIL.

Segmenter module 610 is used for multi-token triggers. When a QRIL record is processed by QRIL processor device 600, segmenter module 610 may analyze the trigger value associated with the QRIL record to determine if subkey propagation impacts this QRIL record. Subkey propagation is another term for application of multiple rewrites to a single trigger. This may also refer to the use of multiple QRIL records to generate a single rewrite when tokens of the QRIL records overlap. If a metaflag such as allow subkey propagation 524 indicates that subkey propagation is not allowed for the QRIL record, then the trigger segment module 610 will not need to segment the trigger. If subkey propagation is allowed, then tokens within a trigger value may be parsed and other QRIL records that have similar or identical trigger values may be analyzed to generate the standardized rewrite. For example, if a QRIL record has a trigger of "cheap brand alpha beta shoes," the segmenter module may use system rules or other system information to segment this trigger into three subkeys: "cheap," "brand alpha beta," and "shoes." The segmenter module 610 may then communicate with a QRIL record database to identify any other QRIL records with shared constraints and trigger values having the tokens "cheap," "brand alpha beta," "shoes," or any combination of these. All of these QRIL records may be passed to other modules to resolve conflicts and generate standardized rewrites. In the example rewrite generated with subkey propagation, this may involve a single standardized rewrite with the trigger value "cheap brand alpha beta shoes" where the rewrite value is a combination of values generated for this standardized rewrite using a plurality of QRIL records associated with the triggers "brand alpha beta," "shoes," and "brand alpha beta shoes."

The segmenter may use a dictionary to identify segments that should not be split. For example, certain embodiments may include "brand alpha beta" in a dictionary that identifies this brand name as a phrase that should not be broken into smaller parts during processing by segmenter module 610. The dictionary enables the segmenter module 610 to perform dictionary based decision making on how to segment strings of information or groups of tokens that make up values such as trigger or rewrite values. In certain embodiments, segmenter module 610 may generate such a dictionary by performing an initial analysis of all QRIL records to be used to generate a set of standardized rewrites. Such QRIL records may be identified by a QRIL element that associates each QRIL element with one or more sets, search engines, or other such groupings. In other embodiments, QRIL record constraints may be used to identify which QRIL records will be used by a particular system or set of standardized rewrites. The segmenter module may use the identifier to determine each entry for a dictionary from the terms in the QRIL records. After the dictionary is generated or updated, the QRIL processor 600 may then proceed to process each QRIL record to generate a set of standardized rewrites.

In certain embodiments, such a dictionary may be generated using a category tree which is part of a system, a search engine, a publication system such as publication system 1100, or any other such system. Such a category tree may include a listing of products types, brand names, item descriptions, or any other details associated with items that may be sold via an online storefront or publication system. Such information may be categorized in multiple nested categories or categories in any number of levels in a tree structure. The terms present at any level, structure, or branch of such a category tree may be parsed or otherwise analyzed to generate a dictionary. Such a dictionary may retain category information which provides some detail about relationships between terms or dictionary entries which share a category. As a segmenter module parses or otherwise analyzes terms in a QRIL record, such a dictionary that is derived from a category tree may identify brand names, product descriptions, or other such product information within a QRIL record, and use that information to generate segments as part of segmenter module analysis. Such a dictionary may additionally be used by any other module in a query transcoding her that generates QRIL records, a QRIL processor, a search engine, or any other aspect of a system described herein.

For recursive rewrites, the segmenter module 610 may segment rewrite values associated with a QRIL record to generate rewrite segments made up of a portion of the tokens of the QRIL records rewrite value. The segmenter module 610 may then communicate with a QRIL record database to identify QRIL records that have trigger values that match the rewrite segments generated by the segmenter module 610. Just as described above, these QRIL records may then be sent to other modules for conflict resolution and generation of a final standardized rewrite.

A bag of words model is a simplifying representation used in language processing and information retrieval. Such a model disregards word order and grammar, and uses the words or tokens irrespective of order. Certain embodiments of such a model may build a dictionary of words in a query or trigger, and use this dictionary to associate a category, or type to a query or aspects of a query. Bag of words module 620 may use such a bag of words model to identify trigger and rewrite segments, and also to generate standardized rewrite elements for a search engine that essentially structure query elements which result from a standardized rewrite to provide information to the search engine. Additionally, for complex rewrites that may generate 10-20 or more rewrite words for a trigger with only one or a few words, generation of a bag of words dictionary as part of the rewrite may save significant computation resources within the search engine and may enable a faster response to a user query. A standardized query rewrite may thus, in certain embodiments, include a bag of words dictionary that may be passed to a search engine as part of the standardized query rewrite. In certain embodiments, such a bag of words dictionary may further use the category tree dictionary described above for the segmenter module to identify phrases such as brand names as a bag of words dictionary is generated.

Fuzzy rewrite generator module 630 may accept groups of QRIL records from segmenter module, bag of words module 620, or any other such module, and may process the groups or sets of values or tokens that may be present in the related QRIL records as propagated subkeys, derived rewrites, recursive rewrites, or other metaflag identified relationships between multiple QRIL records in order to generate one or more standardized rewrites based on the information in the related one or more QRIL records.

Rewrite resolver module 640 may similarly take one or more QRIL records retrieved by segmenter module 610 when conflicts between multiple QRIL records are identified. In certain embodiments, fuzzy rewrite generator module 630 and rewrite resolver module 640 may be integrated together as a single resolver module that processes related and/or conflicting QRIL records to generate one or more standardized rewrites from the related QRIL elements. In embodiments where fuzzy rewrite generator module 630 and rewrite resolver module 640 are separate, fuzzy rewrite generator module 630 may generate rewrites without checking for conflicts, and rewrite resolver module 640 may modify rewrites generated by fuzzy rewrite generator module 630 to resolve conflicts. Rewrite resolver module 640 may thus implement any systems or methods for resolving conflicts between rewrites described herein. For example, if a QRIL record for a standard rewrite and a QRIL record for a phrase rewrite with the same tokens in the trigger values are identified, the rewrite resolver module 640 may identify a single rewrite to be generated from the two QRIL records.

In other words, one of the rewrites may be subsumed by the other rewrite, and so one of the QRIL records may not have an associated rewrite in the final set of standardized rewrites because the rewrite for that QRIL was subsumed to another rewrite by rewrite resolver module 640.

Similarly, if one QRIL record maps a trigger to one portion of a category tree that is part of a system, and another QRIL record maps the trigger to another conflicting portion of the category tree, the rewrite resolver module 640 may prioritize one of the category tree mappings, so that a standardized rewrite will generate a rewrite value identifying one category of the category tree but not the other category of the category tree.

Search engine rewrite customization module 650 includes details about the semantic structure required by a search engine. This may include the semantic structure rules used by a search engine, custom input commands available to a search engine, or other details about how the search engine accepts user queries. Search engine rewrite customization module 650 accepts QRIL record information and other rewrite details generated by other modules. Search engine rewrite customization module 650 translates this information into the semantic structure accepted by the search engine. For example, one semantic structure may be a simple Boolean structure which accepts AND and OR operators with bracket characters for nesting logic around words, numbers, symbols, or other tokens in a query. Other semantic structures may include natural language structures, specialized input search commands, or any other such semantic structures. Such information may be provided by a search engine to a QRIL processor, gathered by a QRIL processor by scraping or crawling an instruction page associated with a search engine via a network communication link, or by a user input to an input device such as a keyboard of a QRIL processor device 600.

In certain embodiments, a standardized rewrite output search engine rewrite customization module 650 may include rewrite values with a complex expression. Rewrite optimizer module 660 may use Boolean logic to simply aspects of an expression. For example, if a rewrite value includes separate query commands to search for term alpha in category Z, term beta in category Z, and term delta in category Z, the rewrite optimizer module 660 may adjust the rewrite value to include a query command to search for term alpha or term beta or term delta in category Z. This may improve efficiency both by shrinking the size of the standardized rewrite and by improving the efficiency in the search engine by replacing three independently run category searches with a single category search. In other embodiments, other logic or adjustment algorithms may be used to improve operation of rewrites by shrinking the total size of the set of standardized rewrites and by reducing the resource usage in a search engine when a standardized rewrite is used. In certain embodiments, a rewrite optimizer module 660 may shrink the number of characters used in a standardized query rewrite by more than 30%.

Thus, as described above. QRIL processor device 600 operates using the above modules or any such combination of such modules to perform three tasks. The first is the interpretation of individual QRIL records including constraints and metaflags in QRIL elements to determine when an associated rewrite applies and what the rewrite will do when operating in a search engine as a standardized query rewrite. The second is determining how individual rewrites as represented by QRIL records interact with each other under standardized rules to create a predictable rewrite outcome in a complex system. Third, QRIL processor device 600 operates to generate a compact expression for a set of standardized rewrites that will execute quickly and efficiently in a search engine.

Figure 7:
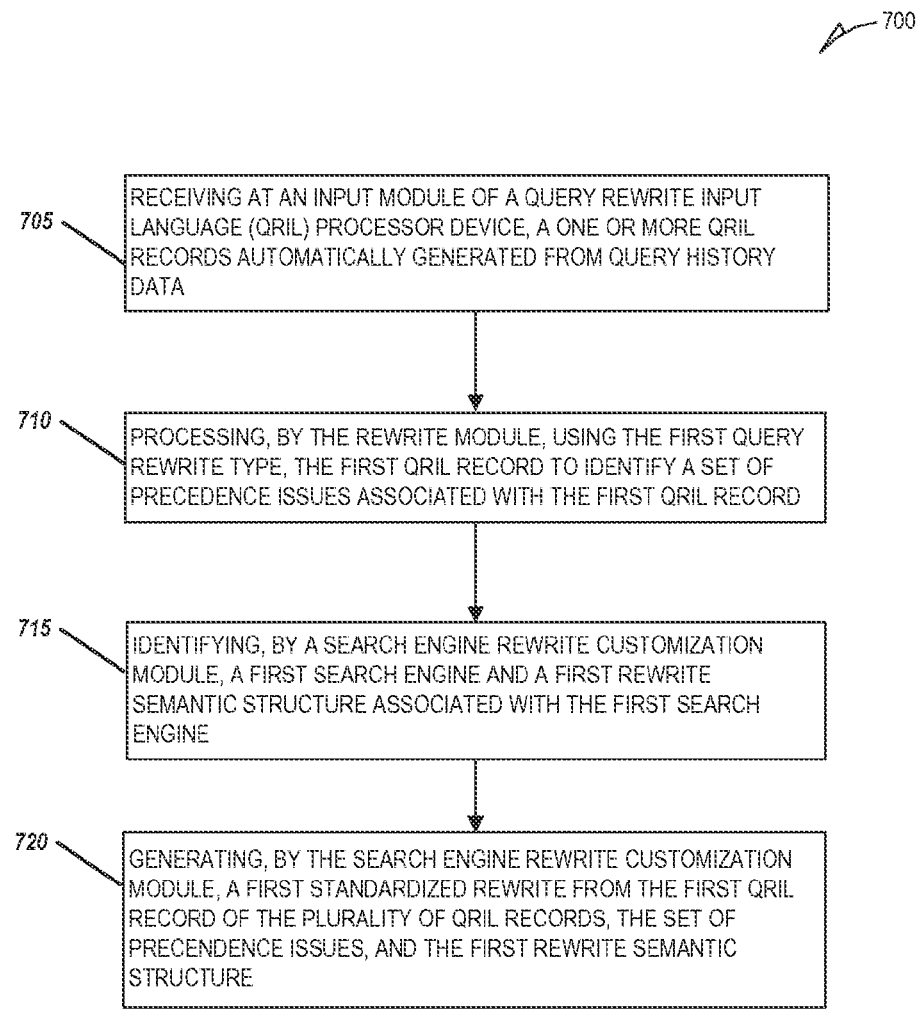
FIG. 7 illustrates one method for generating standardized rewrites with a QRIL processor according to an example embodiment.

FIG. 7 illustrates a method 700 for generating standardized query rewrites according to one example embodiment. For the purposes of illustration, method 700 is described with respect to QRIL processor device 600. In other embodiments, method 700 may be performed by other systems or devices.

Operation 705 involves receiving at an input module 605 of a query rewrite input language (QRIL) processor device 600, a one or more QRIL records. In certain embodiments each QRIL record comprising a trigger value, a query rewrite value, and one or more metaflag elements comprising a query rewrite type metaflag that identifies each QRIL record as associated with a query rewrite type. Various embodiments may use different QRIL record structures.

Operation 710 involves processing, by the rewrite resolver module 640, using the first query rewrite type, the first QRIL record to identify a set of precedence issues associated with the first QRIL record. In certain embodiments, such precedence issues may involve identifying, by a rewrite resolver module, the first query rewrite type for a first QRIL record of the one or more QRIL records. Any query type precedence or conflict precedence described herein for generation or identification of any QRIL element or rewrite information or value may be identified as a precedence issue by the rewrite module. This identification may be done by parsing QRIL tokens or characters and identifying matching tokens or characters in different QRIL records or rewrites that generate a conflict, rewrite derivation, rewrite subsumption, category conflict, rewrite merger, or other precedence issues.

Operation 715 involves identifying, by a search engine rewrite customization module 650, a first search engine and a first rewrite semantic structure associated with the first search engine. As discussed herein, a semantic structure refers to the commands and logic recognized by a search engine as part of the structure of a query. This may include logical AND and logical OR operators. This may include customized commands, or particular natural language structures. Where "natural language" structures are used, the semantic structure may refer to particular algorithms used by a search engine to parse, organize, and otherwise interpret user queries. Search engine rewrite customization module 650 may gather such semantic structure information from a search engine, or from an operator input identifying a semantic structure type associated with a search engine.

Operation 720 involves generating, by the search engine rewrite customization module 650, a first standardized rewrite from the first QRIL record of the plurality of QRIL records, the set of precedence issues, and the first rewrite semantic structure. This essentially generates an expression in a semantic structure recognizable by a search engine that may be used by a search engine's cache to rewrite a user query. After the standardized rewrite is generated in operation 20, it may be used to update a set of standardized rewrites, and these standardized rewrites may be stored in a production database which may be used for testing purposes, or sent to a search engine for use in search engine operation.

Additional embodiments may further operate by analyzing, using a segmenter module 610, a first trigger value of the first QRIL to identify one or more trigger segments; and analyzing, using the segmenter module 610, the one or more QRIL records to identify trigger values that match at least one of the one or more trigger segments. Still further embodiments may operate by identifying, using the segmenter module 610 a first trigger segment of the first trigger value, wherein the first trigger value comprises a plurality of tokens and wherein the first trigger segment consists of a first token of the plurality of tokens; identifying, using the segmenter module, a second QRIL record, wherein a second trigger value of the second QRIL record consists of the first token; wherein the first standardized rewrite is further generated using the second QRIL record.

Further embodiments may operate by generating, using a fuzzy rewrite generator module 630, a fuzzy rewrite value associated with the first QRIL, where the fuzzy rewrite value is generated from the first QRIL record and the second QRIL record. In such an embodiment, the first standardized rewrite may comprise a rewrite expression that is the fuzzy rewrite value expressed in the first rewrite semantic structure. Such a fuzzy rewrite value may be a rewrite value generated using approximate string matching for any element of a QRIL record.

Further embodiments may operate by parsing the first QRIL record with a bag of words generator module 620 using a category tree dictionary to generate a first dictionary token list for the first QRIL record. In certain such embodiments, the first standardized rewrite comprises the first dictionary token list.

Further embodiments may operate by analyzing, using a rewrite optimizer module 660, with the first standardized rewrite to identify a first logical structure of the first standardized rewrite as expressed in the first rewrite semantic structure. Such an embodiment may additional operate by identifying a second logical structure different from the first logical structure and that is logically equivalent to the first logical structure and generating an optimized first standardized rewrite comprising the second logical structure expressed in the first rewrite semantic structure using the first standardized rewrite. One specific such embodiment may operate where the first standardized rewrite comprises at least two search commands associated with a first category of a category tree, and where the optimized first standardized rewrite consists of a single search command associated with the first category of the category tree. As discussed above, this logical manipulation results in the same logical query being presented to a search engine, but with a single search made in a category compared with multiple searches being made in a category. For example, in a system with a category tree, a single category search may involve a search for hundreds of products offered by thousands of virtual stores. Repeatedly searching such a category multiple times may involve inefficient and wasteful resource usage, when a single "A" OR "B" OR "C" search may replace three separate searches of the category.

Further embodiments may operate by receiving, at a query factorization module of a search engine, an updated set of standardized rewrites comprising the first standardized rewrite; receiving, at the search engine from a first client device, a first search engine user query; rewriting the first search engine user query using the first standardized rewrite and the query factorization module; generating a first set of search results for the first search engine user query using the first standardized rewrite; and communicating the first set of search results for the first search engine user query from the search engine to the first client device.

Further embodiments may operate by identifying a second QRIL record, wherein a first set of tokens of a first trigger of the first QRIL record are the same as a second set of tokens of a second trigger of the second QRIL record and wherein a first query rewrite type associated with the first QRIL record is different than a second query rewrite type associated with the second QRIL record.

Further embodiments may operate where the first query rewrite type consists of one of a phrase rewrite type, a token refinement type; a direct rewrite type; and a whole query rewrite type. Further embodiments may operate where generating the first standardized rewrite from the first QRIL record of the plurality of QRIL records, the set of precedence issues, and the first rewrite semantic structure comprises generating the first standardized rewrite using a second rewrite value of the second QRIL record without using a first rewrite value of the first QRIL record based on a type priority of the second query type over the first query type.

Any of the embodiments described above may be implemented in alternate configurations using other module structures or systems. Further, additional embodiments using other elements not specifically described above with respect to FIG. 7 will be apparent in view of the other descriptions provided herein.

Figure 8:
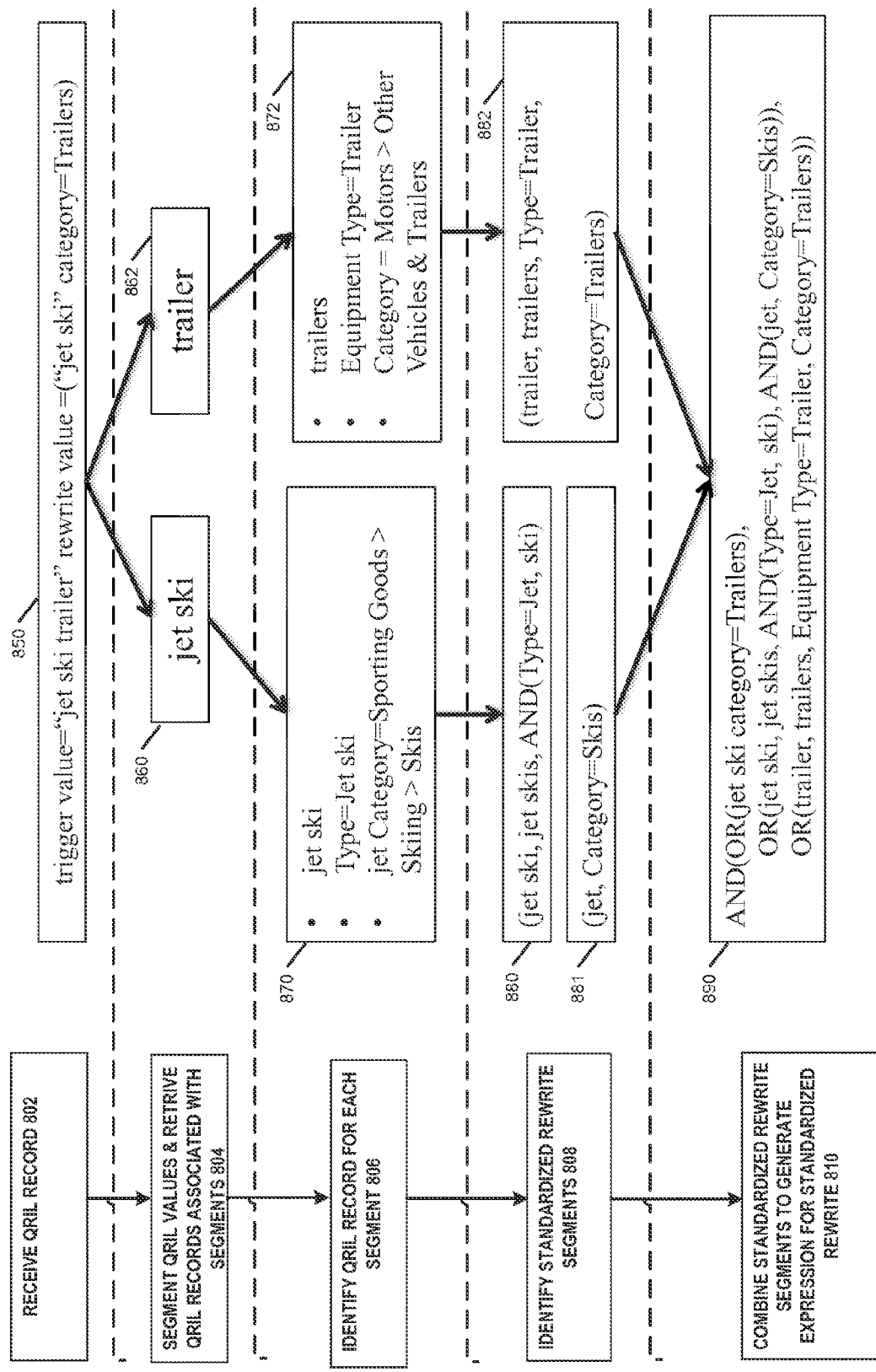
FIG. 8 illustrates aspects of generating standardized rewrites with a QRIL processor according to an example embodiment.

FIG. 8 illustrates aspects of a method that may be used to generate standardized rewrites from QRIL records along with QRIL and rewrite elements that are associated with the example operations. In operation 802, a QRIL processor such as QRIL processor device 600 receives a QRIL record. Element 850 illustrates aspects of a QRIL record including a trigger value which is "jet ski trailer" and a rewrite value which is "jet ski" with a rewrite value category of "trailers". The received QRIL record may include additional elements which are not shown by element 850.

In operation 804, a QRIL processor module such as segmenter module 610 may be used to segment the words or tokens within QRIL record received in operation 802. As shown by elements 860 and 862, segmentation of the words or tokens from the received QRIL record may identify "jet ski" and "trailer" as segments from the QRIL values illustrated by element 850. Then in operation 806, a search is performed to identify any QRIL records associated with the identified segments. Elements 670 and 672 illustrate aspects of two additional QRIL records that may be identified as associated with the segments "jet ski" and "trailer." Just as with element 850, the QRIL records associated with element 870 and element 872 may include additional QRIL elements which are not shown in the illustrated examples.

In operation 808, standardized rewrites for each query segment are generated. Such generation may be performed by a module such as search engine rewrite customization module 650. As shown by elements 880, 81, and 882, these standardized rewrites are generated in a particular semantic structure that is directly associated with a search engine which will receive the standardized rewrites for use during the search operations.

In operation 810, the standardized rewrites for the initial QRIL record and the QRIL records associated with the segments are joined to generate a complete expression for a standardized rewrite. This process may be performed, in some embodiments, by fuzzy rewrite generator module 630. Element 890 shows an example expression for a standardized rewrite that joins the standardized rewrite segments for the initial QRIL as well as be derived QRIL records associated with the standardized rewrite segments of element 880, 881, and 882.

Figure 9:
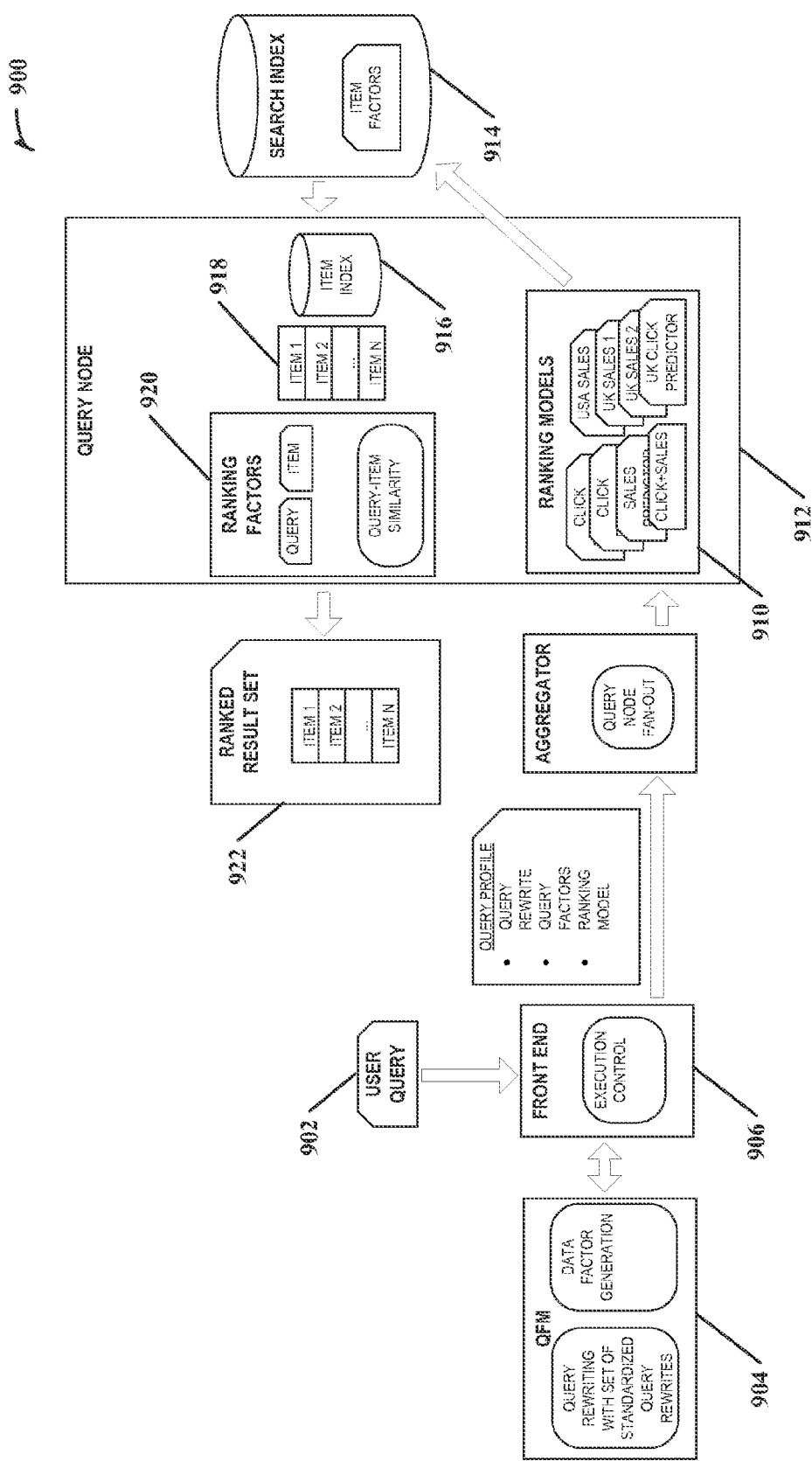
FIG. 9 illustrates one example embodiment of a search engine that may use standardized query rewrites in accordance with the embodiments described herein.

FIG. 9 illustrates one example embodiment of a search engine system 900 that may use standardized query rewrites in accordance with the embodiments described herein. System 900 may, for example, be an implementation of aspects of search engine 160 that receives a set of standardized rewrites from the QRIL processor 140. System 900 may, in certain embodiments, be an ecommerce search engine that is associated with an ecommerce platform or publication system such as system 1100 of FIG. 11.

For users to access online resources, providers such as a provider of ecommerce websites often provide a search service to locate resources pertinent to the user's interest. A goal of the provider is to provide results that satisfy several concerns of both the user and the provider, such as relevant results that induce the user to use the provider again, revenue generation for the provider, and satisfying business partner (e.g., advertisers or sponsors) concerns. When the provider is an e-commerce provider, the considerations of, for example, generating revenue from the sales of item listings returned in search results or business partner concerns can be particularly important (e.g., given more weight) in ranking the results than simply the relevance of an item to the search. The provider may have a tremendous amount and variety of information, which can be used to rank results, such as information about the resources it provides, information on user behavior (e.g., how often users have chosen a given resource in response to a search), provider revenue information, or business partner information. Often the provider will use parts of this information to identify and present resources as results in response to a user search in order to meet the provider's goals. Results can be ranked using the information, wherein the ranking may provide the order in which the results appear to the user.

Traditionally, a provider may spend a great deal of time attempting to determine which pieces of information in its possession are relevant to find and present user search results in a way to meet its goals. The chosen pieces of information often must be assembled, used as inputs into a variety of functions, and weighted against each other. All of these actions typically involve manual intervention by the provider at every step (e.g., identifying the data to be used, developing the functions, and determining relative weights of the functions). Such weighting as part of a searching or matching algorithm to provide search results which matches a user query includes risks of error or corruption of the integrity of the matching. Manipulating matching weights may have unexpected results. By using query rewriting to transform part or all of a user query, a search engine may enable an optimization which prevents certain of such unexpected risks. Additionally, as described above, constraints may be used with query rewrites to enable optimization to be performed on a per user basis, a per storefront basis, a per geographic location, or other targeted basis.

FIG. 9 is a block diagram illustrating details of an example search engine system 900 used to rank search results associated with a user query. System 900 can include module 904, a query front end 906, a query node 912, and a database 914. The query node 912 may also contain a set of ranking models 910, an item index 916, and a set of ranking factors 920 corresponding to a query 902 and item listings 918 returned as a result of a search.

Such a system may use one or more matching algorithms that can be used to match a user query with a database items, and can be used to rank user search results, with the top results returned to the user's client device as a set of search results. FIG. 9 illustrates one implementation of components to rank search results. The front end 906 can receive a query 902 from a user. The front end 906 can then communicate with the query factorization module 904 to rewrite the query 902 and generate data factors from the query 902. The query profile, which is essentially a the user query as modified by the rewrite system plus added data factors can then be sent to the query node 912. An example of a data factor may be a category identifier that is associated with a user query based on terms in the user query and associations between the terms and categories of a category tree.

In one example embodiment, a system 900 may be an e-commerce search engine associated with a publishing platform such as system 1100. The platform of system 1100 may include storefronts for a large number of merchants and sales platforms for the merchants. System 1100 may also include an auction platform, a payment system for auctions and merchant storefronts, and other e-commerce services. As part of all of these e-commerce services together, system 1100 may comprise a category tree which is used to categorize products available for sale or auction via system 1100. Such a category tree may include a top level identifying the category tree, broad categories in a second level under the top level such as an electronics category, a sports equipment category, an automobile category, or any other such category. Each of these categories may be used as a constraint in a QRIL record as described above. Each second-level category may include one or more third level categories which are associated in the tree with one or more second-level categories. For example the electronics category may have third level categories of televisions, computers, smart phones, tablet devices, and other such categories structured under the second level electronics category in the category tree. Each bottom level category or any category in the category tree may have associated keywords, metadata, or other such information relevant to products available for sale via system 1100 which are categorized by the category tree.

Further, a rewrite may not only have a trigger and a rewrite value, but a category rewrite. A category rewrite may limit a search to a particular category in a category tree. QRIL record 500, for example, includes category rewrite 552. Category rewrite may be a rewrite that, instead of replacing a trigger token with a rewrite value, limits a search based on a user query to a particular category of a category tree. For example, a QRIL record 500 may include a trigger "brandA televisions" where the rewrite is a token adjustment rewrite to delete the token "television" and to add the category rewrite "electronics/televisions." Thus, when a user query including "brandA televisions" is received, the rewrite associated with this QRIL that is part of a search engine's set of standardized rewrites will rewrite "brandA televisions" to a query like "brandA:category=electronics/televisions." The search engine will then search for the term "brandA" but only within the category "televisions" under "electronics" in the category tree.

When a user query is received by front in 906, the user query may be sent to QFM 904 for query rewriting and data factor generation. Query rewriting in QFM 904 may use a set of standardized query rewrites as described above. Additionally, data factor generation may identify categories that are associated with the user query. For example, history data associated with a user that submits user query 902 may be used to distinguish between ambiguous terms such as "Apple." Such categorization may be associated with user query 902 and used as constraining information based on any constraints associated with query rewrites as part of a set of standardized Paris rewrites. Additionally, as described for example in QRIL record 500, query rewrites generated from QRIL records may include category values which are associated with the category tree described above. In such embodiments, an additional query rewrite type may include other category rewrites. Other rewrites may use keywords, products, or other terms within a category tree that are associated with the user query or tokens any user query by the data factor generation of QFM 904. QFM 904 may thus include one or more modules for categorization of user query 902 which is then used for dynamic query rewriting based on information within the modules. This may include time sensitive information associated with merchant sales, holiday sales, user history associations with particular merchants, or any other such information which may be used in data factor generation is a dynamic input to other category query rewrite.

In embodiments where other category query rewrites are used, the system will include conflict rules for this type of rewrite in addition to all other types of rewrites available to the system. In one embodiment, for example, other category query rewrites are in a lowest priority and are only used if no other rewrites are present for user query 902. In certain embodiments, conflicts between multiple other query rewrites will typically not occur because the other query rewrite will be a single rewrite generated by the other rewrite system. This single rewrite is generated by the other rewrite system based on a category analysis or some other analysis system where rewrites are based on groups of category associations rather than a defined transform from a token a user query to a rewrite value. Instead the other query rewrite will be based on preference information or system settings within a query other rewrite module as part of data factor generation in QFM 904.

The other query rewrite may result in problems when descendent or recursive query rewrites are allowed with other query rewrites. For example, the other query rewrite may rewrite the key word of user query 902 to a category of category tree. Thus, instead of a search for tokens of the user query, a search will be performed directed to keywords, products, or other information associated with the category of the category tree. Such a rewrite to a category may further allow query rewrites based on information within the category. As an example, the user query "brandA men's shoes" may be rewritten by the other query rewrite to "brandA" and an associated category search restriction on "clothing, shoes and accessories/men's shoes/athletic." If the system also includes a direct rewrite with the trigger "brandA shoes" with a rewrite value of "brandA" and a category search restriction on category "clothing, shoes and accessories/men's shoes," then the second conflicting search will potentially include a much broader set of results than the first rewrite. As described above, such a conflict may be resolved by either prioritizing a rewrite type, or by prioritizing a rewrite that will result in a narrower set of search results.

The query may be rewritten using a set of standardized rewrites received such as the set of standardized rewrites 142 generated by QRIL processor 140 from a set of QRIL records in QRIL record database 130.

The query node 912 can apply one or more ranking goal models 910 to the query profile. Such a ranking goal model 910 may identify the type of match that qualifies as a search result for a particular query or query profile. In an example, the goal models can also be used to select search results from database 914. The database 914 can return a search index of the item listings returned as a result of the query 902.

Item index 916 can include the raw returned item data to the query node 912 where the list of item listings 918 is unranked (e.g., unordered). The set of ranking data factors 920 can include all of the data factors for a given item listing and query 902 to be used by the set of ranking goal models 910. The factors can be inputted into the ranking goal models 910 to produce a ranked result set 922 that can then be presented to the user. In an example, a higher ranked item listing can be displayed more prominently than a lower ranked item listing (e.g., the higher ranked item listing can appear higher in the list of search results presented to the user than the lower ranked item listing. In an example, prominently displaying the higher ranked listings can include using color (e.g., varying background or foreground color), animation, or additional visual decorations (e.g., borders, titles, etc.)

In example 900, the search query is may be for items being sold in an online publishing system or marketplace, but other examples where a user queries a data resource and the results are ranked and returned are also contemplated. The various components of system 900 can be executed in software, hardware, or some combination thereof. In the case of software components, it will be understood that the hardware necessary to execute the software will also be present.

Figure 10:
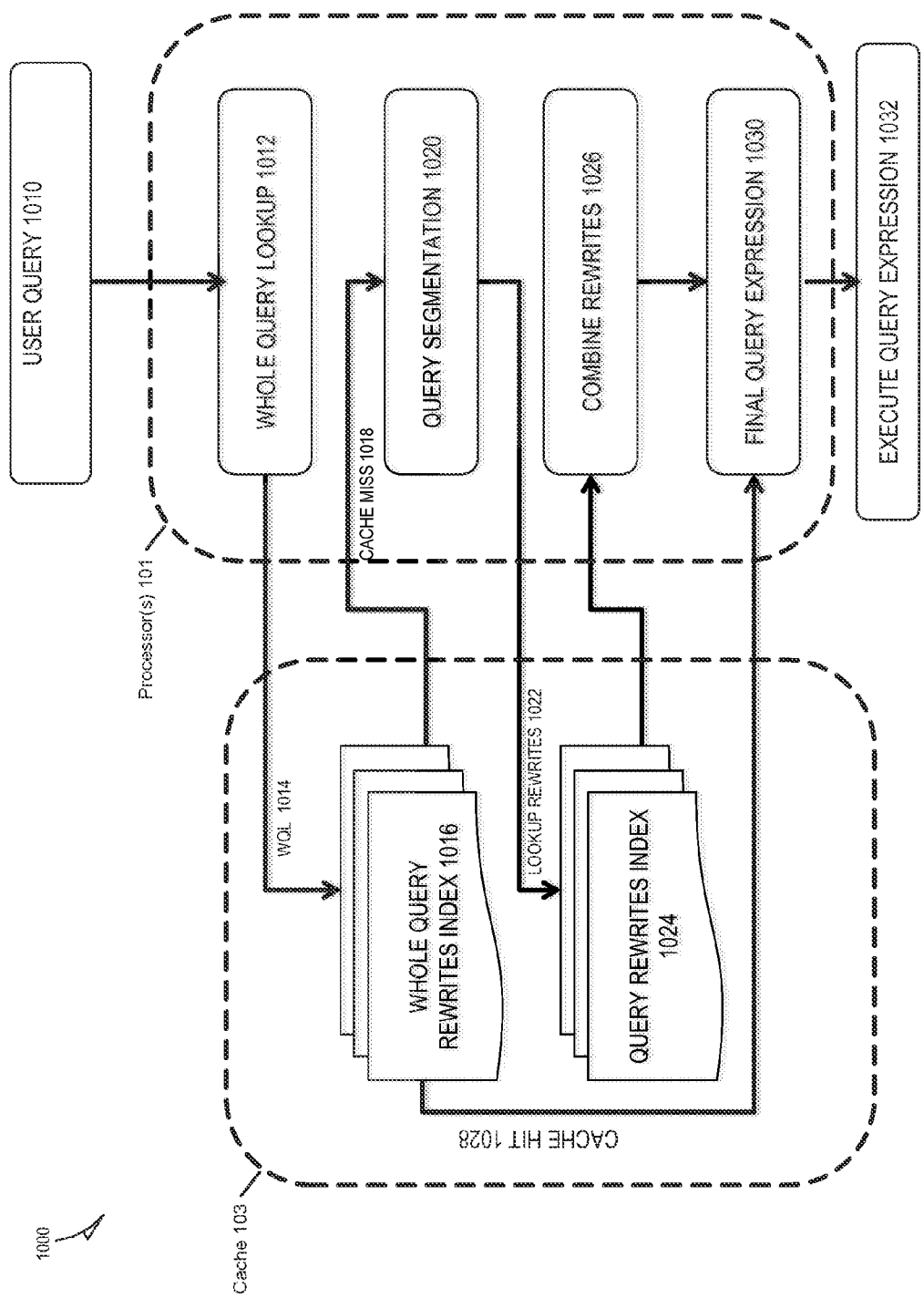
FIG. 10 illustrates aspects of a search engine using standardized rewrites according to an example embodiment.

FIG. 10 is a hybrid diagram that illustrates aspects of query rewriting and standardized rewrites as used within a query factorization module (QFM) 1000 of a search engine. QFM 1000 is implemented using one or more processors 101 and a memory coupled to processor 101 shown as cache 103. Processors 101 perform a series of operations, including cache memory calls to cache 103, and generate expressions that are passed to the search engine query node to be executed as part of search engine operation. Cache 103 includes a set of standardized rewrites organized as in one or more indexes. In certain embodiments, a set of standardized rewrites is loaded into a cache 103 of a search engine in order to provide extremely fast rewrites for the search engine. As mentioned above, in certain embodiments, rewrites with manual system operator inputs or even database calls do not provide the response time needed for many implementations, and so sets of standardized rewrites may be generated or updated and loaded into a search engine cache which provides service levels necessary for the search engine to respond to a user query. The illustrated index of cache 103 includes whole query rewrite index 1016 and query rewrites index 1024. In certain embodiments, whole query rewrites may be indexed separately from the other standardized rewrites for efficiency as discussed below.

In illustrated operation 1010, a user query is received by processor 101. Processor 101 initially performs a whole query lookup in operation 1012 to determine if a standardized rewrite that is an exact match for the user query received in operation 1010 is present in cache 103. If the whole query lookup cache request of operation 1014 identifies a whole query rewrite with a trigger that exactly matches the user query from operation 1010 then a cache hit 1028 is identified, and a final query expression 1030 which is simply the expression from the whole query rewrite, is identified. This expression is used as the input to the search engine and executed as the query expression in response user query 1010.

If there is no exact match to user query 1010 in the whole query rewrite index 1016, then a cache miss 1018 is communicated from cache 1030 to processor 101. Query segmentation 1020 is then performed by a processor 101. This query segmentation process may be similar to or identical to the segmentation process described for segmenter module 610 of QRIL processor 600. As previously described, this may include the use of a dictionary or any other such input or assistance in segmenting tokens of user query 1010. The segments identified by query segmentation 1020 are used for lookup rewrites 1022 to determine if standardized query rewrites for these segments exist in cache 103 as part of query rewrite index 1024. Any standardized rewrites found in for a rewrite index 1024 that match segments are provided to combine rewrites 1026. Combine rewrites 1026 may operate in a fashion described above for fuzzy rewrite generator 630. Because a QRIL processor is structured to identify conflicts, no conflicts should be present in the standardized rewrites of query rewrite index 1024. If no standardized query rewrites are found for user query 1010, then the user query is simply passed to the search engine for execution as the final query expression 1030 in execution of the query expression by the search engine in operation 1032.

If any query rewrites are found in query rewrite index 1024, then these standardized rewrites will be combined with other tokens of user query 1010 to generate final query expression 1030. This process may be similar to the combination illustrated by FIG. 8. In certain embodiments, a search engine or QFM 1000 may have unique or customize rules for combining rewrites to generate a final query expression. These rules may be communicated or gathered by a QRIL processor such as QRIL processor device 900, and used by the QRIL processor as part of the precedence rules to generate standardized rewrites. Thus, the standardized rewrites in query rewrite index 1024 are generated to account for the particular rules, structures, or ordering processes used to combine rewrites in combine rewrites 1026. Once a final query expression 1030 is identified, either as the original user query 1010 if no standardized rewrites exist or as a standardized rewrite expression, the final query expression 1030 is passed to the search engine an input as a search that is executed. In the example of FIG. 9, this may involve QFM 904 passing the final query expression through front end 906 to query node 912 for generation of a ranked result set 922 which will be communicated to a user in response to the user's query.

As discussed above, the QRIL processor that provides standardized rewrites to cache 103 optimizes the type and amount of information provided to cache 103. For example, in certain embodiments, QRIL processor may function to filter out rewrites from query rewrites index 1024 that would never be used because a different rewrite would always take precedence. Thus, the QRIL processor enables efficiency in the use of cache 103 resources and the processor 101 resources used in generating final rewrites, in a search engine environment where resource usage and associated response times are important metrics.

Figure 11:
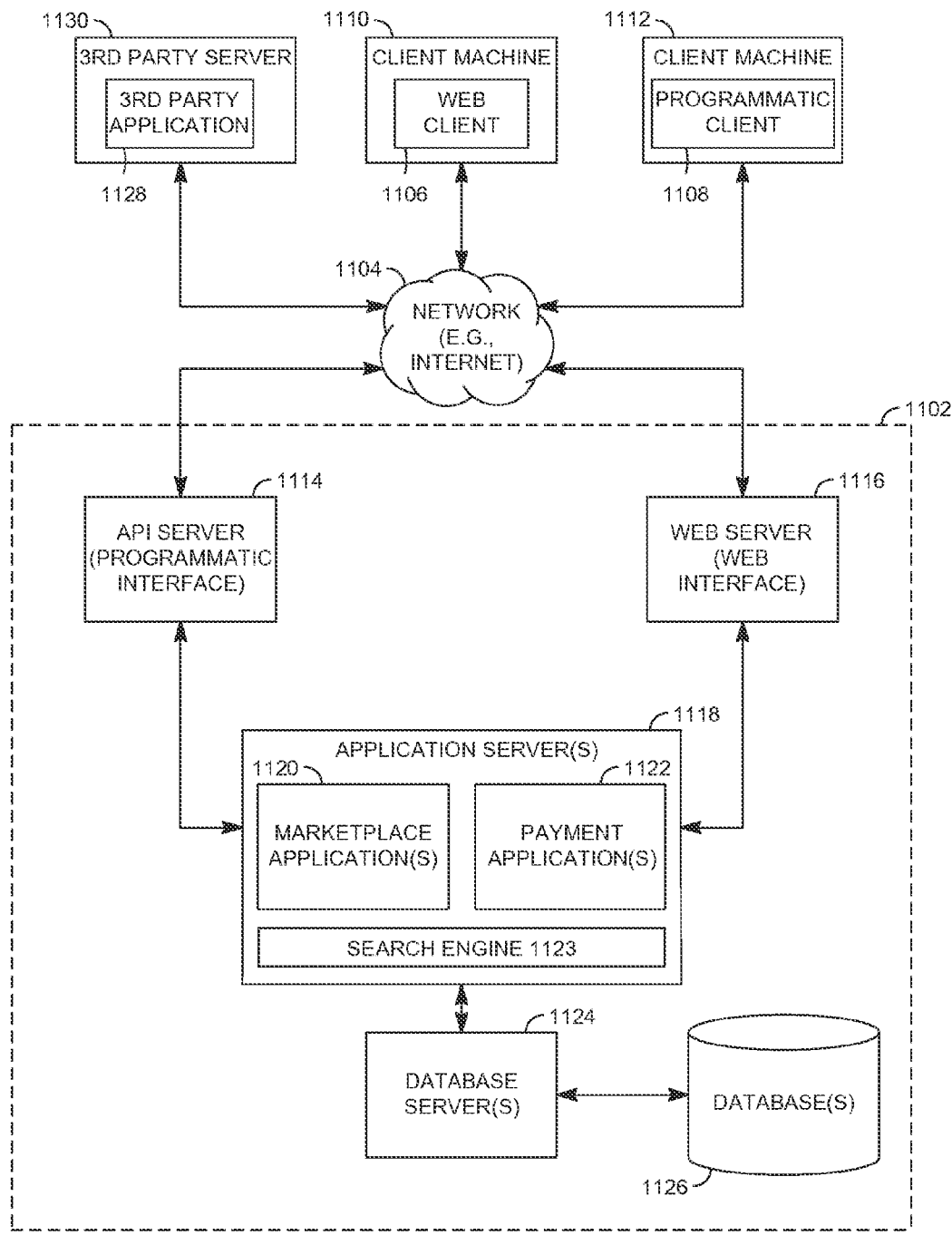
FIG. 11 is a block diagram illustrating a network based system which may be used with embodiments described herein.

FIG. 11 is a block diagram illustrating a network based publication system which may be used with embodiments described herein. FIG. 11 depicts client-server system 1100, which may be used with various embodiments. For example, search engine 160 or system 900 can be deployed as part of system 1100. A networked system 1102, in the example forms of a network-based marketplace or publication system, provides server-side functionality, via a network 1104 (e.g., the Internet or Wide Area Network (WAN)) to one or more clients. Merchants may, in certain embodiments, register with a publication using a registration process such as the process of operation 305 described above. Such merchants may use system 1100 to present a storefront to client devices, including search engine operations provided as part of the merchant's storefront. The merchant may then provide rewrites to a rewrite transcoder that generates QRIL records which include constraints that apply only to the merchant's storefront as operating on system 1100. Client devices may then submit search queries to system 1100, and the search engine operating as part of system 1100 may use standardized query rewrites generated from the QRIL records to generate search results and send the search results to the client device.

FIG. 11 illustrates, for example, a web client 1106 (e.g., a browser, such as the Internet Explorer browser developed by Microsoft Corporation of Redmond, Wash. State), and a programmatic client 1108 executing on respective client machines 1110 and 1112. Client machines 1110 and 1112, as well as third party servers 1130, may send search queries to a search engine 1123 which operates with marketplace applications 1120 to provide ecommerce services to users. Search engine 1123 may use standardized query rewrites as described in the example embodiments above.

An Application Program Interface (API) server 1114 and a web server 1116 are coupled to, and provide programmatic and web interfaces respectively to, one or more application servers 1118. The application servers 1118 host one or more marketplace applications 1120, payment applications 1122, and search engine 1123. The application servers 1118 are, in turn, shown to be coupled to one or more databases servers 1124 that facilitate access to one or more databases 1126.

The marketplace applications 1120 may provide a number of marketplace functions and services to users that access the networked system 1102. The payment applications 1122 may likewise provide a number of payment services and functions to users. The payment applications 1122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1120. While the marketplace and payment applications 1120 and 1122 are shown in FIG. 11 to both form part of the networked system 1102, it will be appreciated that, in alternative embodiments, the payment applications 1122 may form part of a payment service that is separate and distinct from the networked system 1102.

Further, while the system 1100 shown in FIG. 11 employs a client-server architecture, the present invention is of course not limited to such an architecture, and could equally well find application in a distributed, or peer-to-peer, architecture system, for example. The various marketplace and payment applications 1120 and 1122 as well as search engine 1123 could also be implemented as standalone software programs, which do not necessarily have networking capabilities, or as separate specialized devices which are connected via a network.

The web client 1106 accesses the various marketplace and payment applications 1120 and 1122 via the web interface supported by the web server 1116. Similarly, the programmatic client 1108 accesses the various services and functions provided by the marketplace and payment applications 1120 and 1122 via the programmatic interface provided by the API server 1114. The programmatic client 1108 may, for example, be a seller application (e.g., the TurboLister application developed by eBay Inc., of San Jose, Calif.) to enable sellers to author and manage listings on the networked system 1102 in an off-line manner, and to perform batch-mode communications between the programmatic client 1108 and the networked system 1102.

FIG. 11 also illustrates a third party application 1128, executing on a third party server machine 1130, as having programmatic access to the networked system 1102 via the programmatic interface provided by the API server 1114. For example, the third party application 1128 may, utilizing information retrieved from the networked system 1102, support one or more features or functions on a website hosted by the third party. The third party website may, for example, provide one or more promotional, marketplace or payment functions that are supported by the relevant applications of the networked system 1102.

Figure 12:
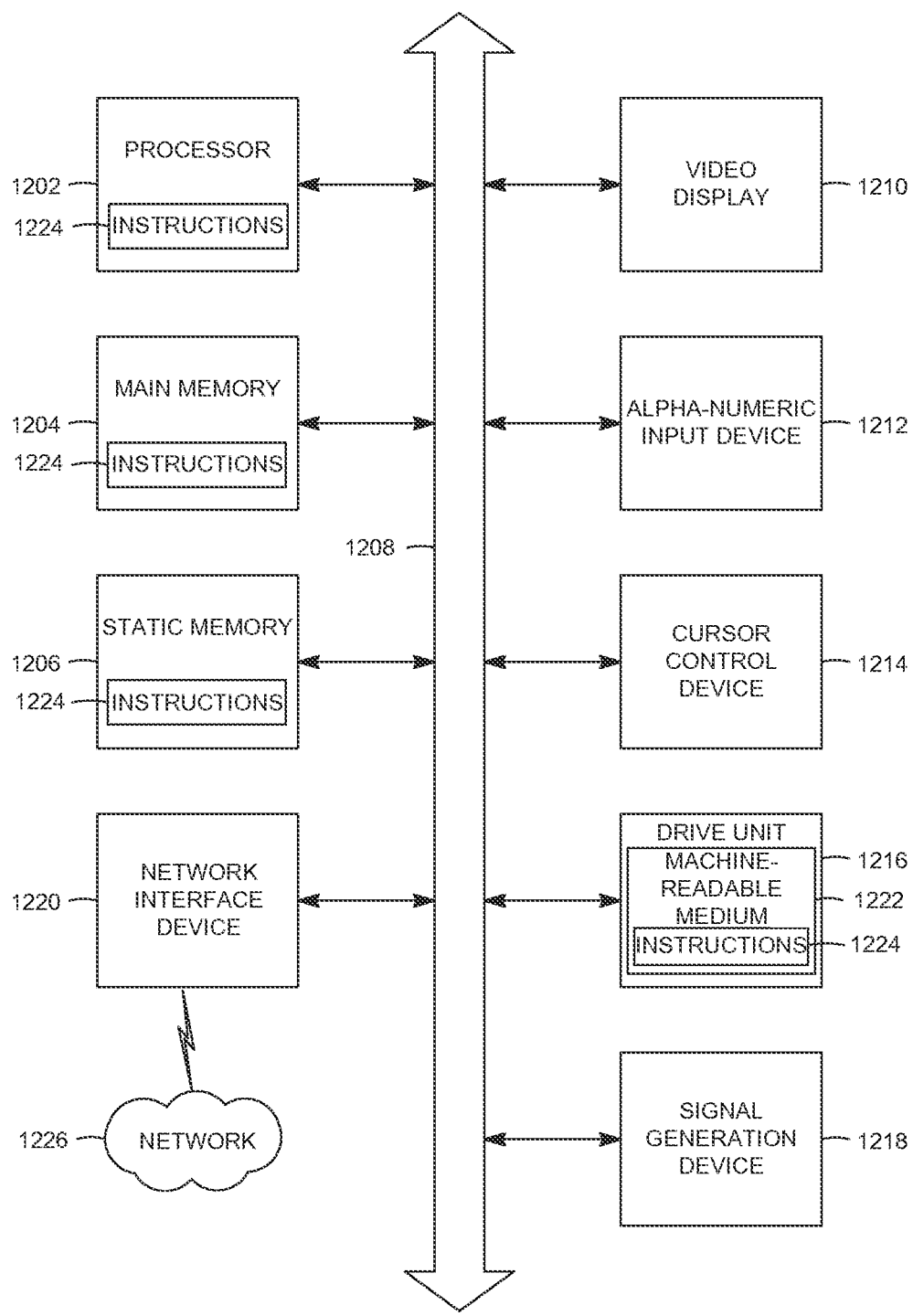
FIG. 12 an example machine which may be used in various embodiments.

FIG. 12 shows a diagrammatic representation of machine in the example form of a computer system 1200 within which a set of instructions, for causing the machine to perform any one or more of the methodologies discussed herein, can be executed. For example, in certain embodiments, a query transcoding device 120, a QRIL processor 160, and a search engine 160 may each use elements of a computer system 1200 to enable specialized computing device systems and processes described above. In alternative embodiments, the machine operates as a standalone device or can be connected (e.g., networked) to other machines. In a networked deployment, the machine may operate in the capacity of a server or a client machine in server-client network environment, or as a peer machine in a peer-to-peer (or distributed) network environment. The machine can be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220.

While the machine-readable medium 1222 is shown in an example embodiment to be a single medium, the term "non-transitory machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system for search result ranking using machine learning have been described. Although the present invention has been described with reference to specific example embodiments, it will be evident that various modifications and changes can be made to these embodiments without departing from the broader spirit and scope of the invention. Accordingly, the specification and drawings are to be regarded in an illustrative rather than a restrictive sense.

While in the foregoing specification certain embodiments of the invention have been described, and many details have been set forth for purposes of illustration, it will be apparent to those skilled in the art that the inventive subject matter is susceptible to additional embodiments and that certain of the details described herein can be varied considerably without departing from the basic principles of the invention.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a data mining device comprising:
        an input module configured to receive, from a network system comprising a search engine, a set of query history data, the set of query history data comprising at least a query value, a set of ranked search results associated with the query value, and a set of user interaction data associated with the query value;
        a data mining module coupled to the input module configured to automatically process the set of query history data to identify a query ranking mismatch and to generate a set of query rewrite data, wherein the set of query rewrite data comprises constraint data and rewrite data, wherein the constraint data comprises at least a first trigger value, and wherein the rewrite data identifies at least a first query rewrite value associated with the first trigger value; and
        an output module configured to communicate, from the automatic query rewrite generation device to a query transcoder, the set of query rewrite data.

2. The system of claim 1 wherein the data mining module comprises a data mining system setting module comprising a first target setting, the first target setting identifying a first query type and a set of target ranked result characteristics associated with the first query type.

3. The system of claim 2 wherein the data mining module further comprises a ranking mismatch identification module, the ranking mismatch identification module configured to:
    identify query history events in a query history database associated with the first query type;
    determine a first set of ranked result characteristics associated with the query history events;
    determine that the first set of ranked result characteristics do not meet the target ranked result characteristics; and
    identify the query ranking mismatch based on the determination that the first set of ranked result characteristics to not meet the target ranked result characteristics.

4. They system of claim 3 wherein the first target setting further comprises the first trigger value and the first query rewrite value.

5. The system of claim 4 wherein the data mining system setting module is configured to generate the set of query rewrite data in response to the ranking mismatch identification module determining that the first set of ranked result characteristics do not meet the target ranked result characteristics.

6. The system of claim 5 wherein the data mining module comprises a ranking model associated with a ranking process of the search engine, wherein the data mining system setting module is further configured to generate the query rewrite data in response to a determination by the ranking model that one or more standardized rewrites associated with the query rewrite data creates ranked search results associated with the first query type that meet the target ranked result characteristics.

7. The system of claim 5 wherein the data mining module further comprises a merchant customization module that provides the first target setting to the data mining system setting module; and
wherein the query rewrite data comprises a constraint value restricting the query rewrite data to a first category of a category tree associated with the search engine.

8. The system of claim 5 wherein the data mining module comprises a category customization module that provides the first target setting to the data mining system setting module; and
wherein the query rewrite data comprises a constraint value restricting the query rewrite data to a storefront of a marketplace system associated with a first merchant.

9. The system of claim 3 wherein the data mining module comprises a query rewrite history module configured to:
parse the set of query history data to identify a query history event associated with the query value, the set of ranked search results, and the set of user interaction data associated with the query value;
associate the query type with the query history event; and
store the query value, the set of ranked search results, the set of user interaction data, and the query type as a first query history event of the query history events in the query history event database.

10. The system of claim 1 further comprising the query transcoding device, wherein the query transcoding device generates a first query rewrite input language (QRIL) record from the set of query rewrite data, wherein the first QRIL record comprises the first trigger value, the first query rewrite value, and a first metaflag element that identifies the first QRIL record as associated with the first query rewrite type.

11. The system of claim 10 further comprising:
a QRIL record database coupled to the query transcoding device;
a QRIL processor device coupled to the QRIL record database, the QRIL processor device configured to access the QRIL record database to retrieve the first QRIL record, process the first QRIL record to generate a first standardized rewrite, and updating a set of standardized rewrites using the first standardized rewrite to generate an updated set of standardized rewrites.

12. The system of claim 11 further comprising:
the search engine system coupled to the QRIL processor device, wherein the search engine system receives the updated set of standardized rewrites, rewrites a first search engine user query from a first client device using the first standardized rewrite to create a rewritten user query, generates a first set of search results for the using the rewritten user query, and communicates the first set of search results the search engine to the first client device.

13. The system of claim 12 wherein the search engine communicates the updated set of standardized rewrites, the first search engine user query, and the first set of search results to the data mining device as second set of query history data.

14. A method of automatically generating query rewrites comprising:
receiving, at an input module of a data mining device, a set of query history data;
processing, using at least a first processor, the set of query history to identify a query ranking mismatch associated with the set of query history data;
generating, in response to the identification of the query ranking mismatch, a first set of query rewrite data comprising a first trigger value and a first query rewrite value associated with the first trigger value; and
communicating the first set of query rewrite data to a query transcoding device.

15. The method of claim 14 further comprising:
parsing the set of query history data to identify a query history event associated with the query value, the set of ranked search results, and the set of user interaction data associated with the query value;
associating a query history type with the query history event; and
storing the query value, the set of ranked search results, the set of user interaction data, and the query history type as a first query history event in the query history event database.

16. The method of claim 15 wherein processing the set of query history to identify the query ranking mismatch comprises:
receiving a first target setting, the first target setting identifying the first query history type and a set of target ranked result characteristics associated with the first query history type;
identifying a plurality of query history events comprising the first query history event in a query history database, the plurality of query history events being associated with the first query history type;
determining a first set of ranked result characteristics associated with the plurality of query history events;
determining that the first set of ranked result characteristics do not meet the target ranked result characteristics; and
identifying the query ranking mismatch based on the determination that the first set of ranked result characteristics to not meet the target ranked result characteristics.

17. The method of claim 16 wherein generating the first set of query rewrite data comprises:
identifying a difference between the first set of ranked result characteristics and the target ranked result characteristics;
determining that the first trigger value and the first query rewrite value are associated with the difference between the first set of ranked result characteristics and the target ranked result characteristics; and
generating the first set of query rewrite data using the first query rewrite value and the first trigger value based on the determination that the first trigger value and the first query rewrite value are associated with the difference between the first set of ranked result characteristics and the target ranked result characteristics.

18. The method of claim 17 further comprising:
analyzing the first set of query data to identify a first query rewrite type associated with the first set of query rewrite data from a plurality of query rewrite types;
generating a first query rewrite input language (QRIL) record from the first set of query rewrite data, wherein the first QRIL record comprises the first trigger value, the first query rewrite value, and a first metaflag element that identifies the first QRIL record as associated with the first query rewrite type;

storing the first QRIL record in a QRIL record database with a plurality of QRIL records;

accessing, by a QRIL processor module, the QRIL record database to retrieve the first QRIL record;

processing the first QRIL record using the QRIL processor module to generate a first standardized rewrite; and updating a set of standardized rewrites using the first standardized rewrite to generate an updated set of standardized rewrites;

receiving, at a query factorization module of a search engine, the updated set of standardized rewrites;

receiving, at the search engine from a first client device, a first search engine user query;

rewriting the first search engine user query using the first standardized rewrite and the query factorization module;

generating a first set of search results for the first search engine user query using the first standardized rewrite;

communicating the first set of search results for the first search engine user query from the search engine to the first client device; and communicating the first search engine user query and the first set of search results to the data mining device as a second set of query history data.

19. A non-transitory computer readable medium comprising computer readable instructions that, when executed by a device comprising at least one processor and a memory coupled to the at least one processor, cause the device to:

receive a set of query history data;

process the set of query history to identify a query ranking mismatch associated with the set of query history data;

generate, in response to the identification of the query ranking mismatch, a first set of query rewrite data comprising a first trigger value and a first query rewrite value associated with the first trigger value; and communicate the first set of query rewrite data to a query transcoding device.

20. The non-transitory computer readable medium of claim 19 wherein the instructions further cause the device to:

parse the set of query history data to identify a query history event associated with the query value, the set of ranked search results, and the set of user interaction data associated with the query value;

associate a query history type with the query history event; and store the query value, the set of ranked search results, the set of user interaction data, and the query history type as a first query history event in the query history event database.

* * * * *